US010999462B2

(12) United States Patent
Okuma et al.

(10) Patent No.: US 10,999,462 B2
(45) Date of Patent: May 4, 2021

(54) INFORMATION PROCESSING APPARATUS INCLUDING PUSH SWITCH, POWER SUPPLY CONTROL METHOD THEREFOR, AND STORAGE MEDIUM

(71) Applicant: CANON KABUSHIKI KAISHA, Tokyo (JP)

(72) Inventors: Yasuhiko Okuma, Suntou-gun (JP); Takahiro Haraguchi, Matsudo (JP); Ryotaro Okuzono, Toride (JP)

(73) Assignee: CANON KABUSHIKIKAISHA, Tokyo (JP)

( * ) Notice: Subject to any disclaimer, the term of this patent is extended or adjusted under 35 U.S.C. 154(b) by 0 days.

(21) Appl. No.: 16/408,855

(22) Filed: May 10, 2019

(65) Prior Publication Data
US 2019/0356801 A1    Nov. 21, 2019

(30) Foreign Application Priority Data

May 16, 2018    (JP) .............................. JP2018-094637

(51) Int. Cl.
*H04N 1/00*    (2006.01)
(52) U.S. Cl.
CPC ..... *H04N 1/00891* (2013.01); *H04N 1/00384* (2013.01); *H04N 1/00392* (2013.01); *H04N 1/00477* (2013.01); *H04N 2201/0094* (2013.01)
(58) Field of Classification Search
None
See application file for complete search history.

(56) References Cited

U.S. PATENT DOCUMENTS

| | | | | |
|---|---|---|---|---|
| 6,438,684 B1* | 8/2002 | Mitchell | .................. | G06F 1/24 |
| | | | | 713/1 |
| 2010/0283636 A1* | 11/2010 | Clark | ..................... | G01C 23/00 |
| | | | | 340/971 |
| 2012/0309525 A1* | 12/2012 | Nogami | .................. | A63F 13/08 |
| | | | | 463/31 |

FOREIGN PATENT DOCUMENTS

JP    2002073220 A    3/2002

OTHER PUBLICATIONS

Translation of JP 2002-073220 (Year: 2002).*

* cited by examiner

*Primary Examiner* — Lennin R RodriguezGonzalez
(74) *Attorney, Agent, or Firm* — Rossi, Kimms & McDowell LLP

(57) ABSTRACT

An information processing apparatus including a push switch turns off a power supply state of a main body and starts shutdown processing when a first user's operation is performed on the push switch in a normal state of the apparatus. When a second user's operation is performed on the push switch during the shutdown processing, the power supply state of the main body is switched between on and off. If the power supply state of the main body is the on state when the shutdown processing is completed, first processing for restarting the main body is performed, and if the power supply state of the main body is the off state when the shutdown processing is completed, second processing for stopping power supply to the main body is performed.

18 Claims, 27 Drawing Sheets

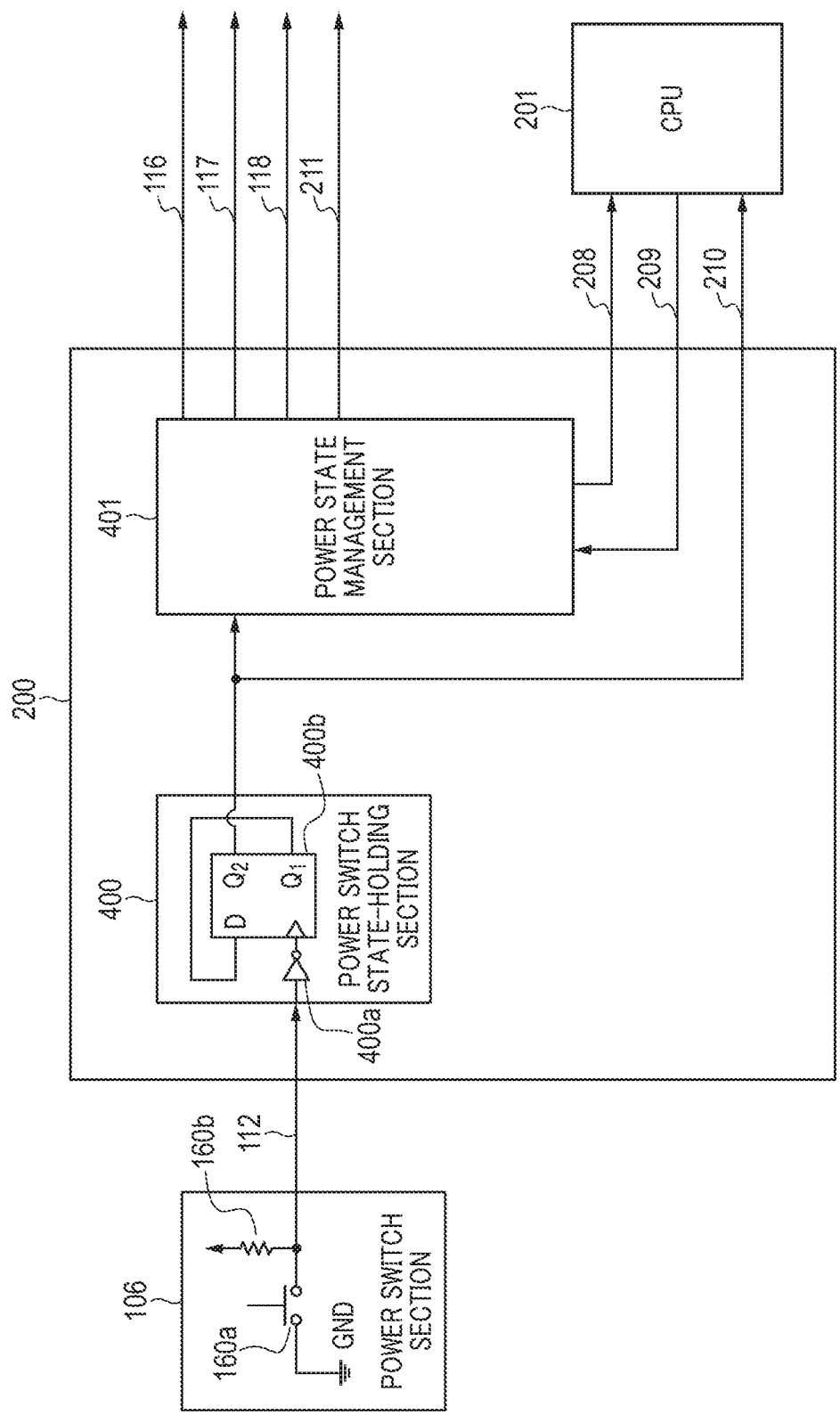

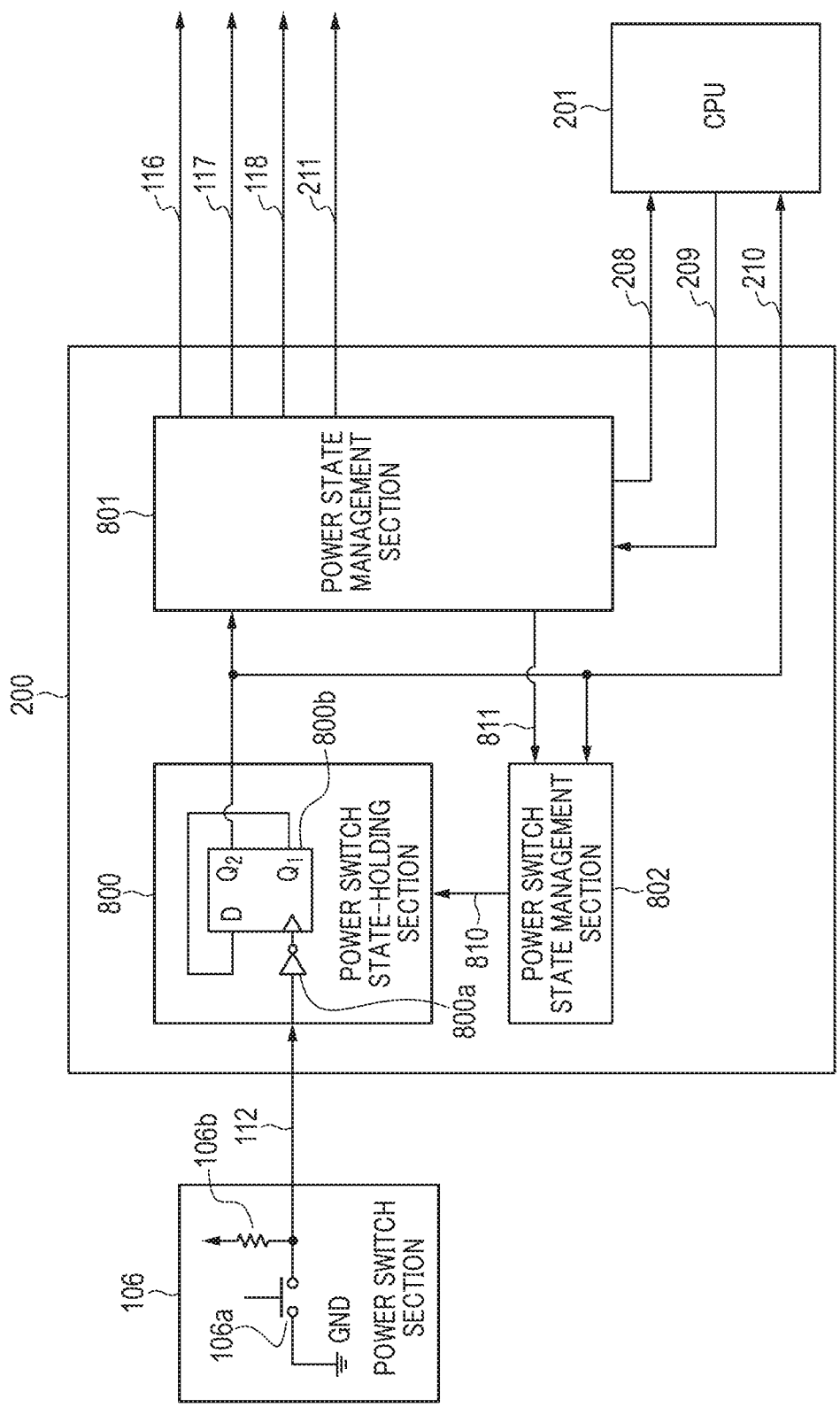

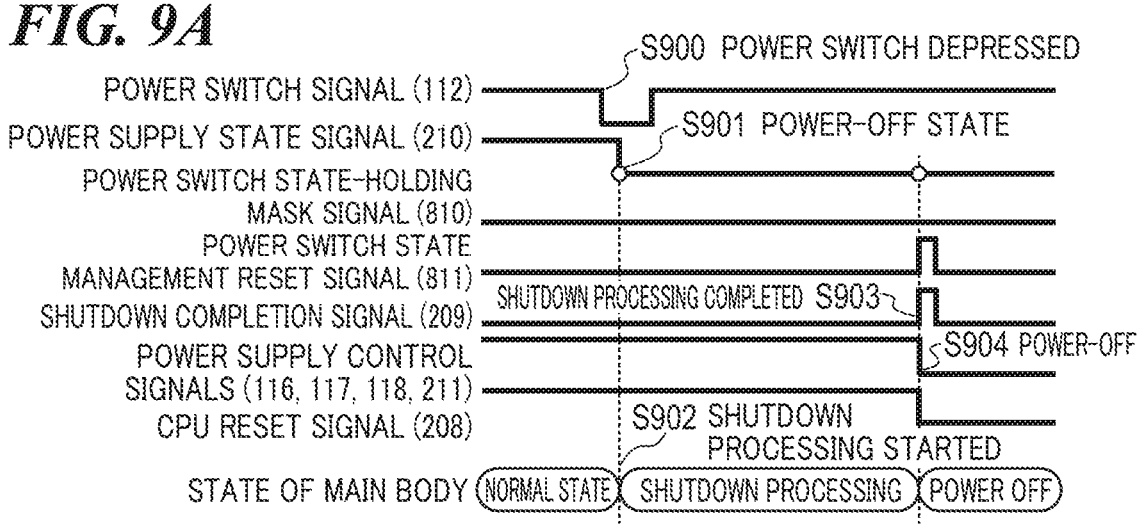
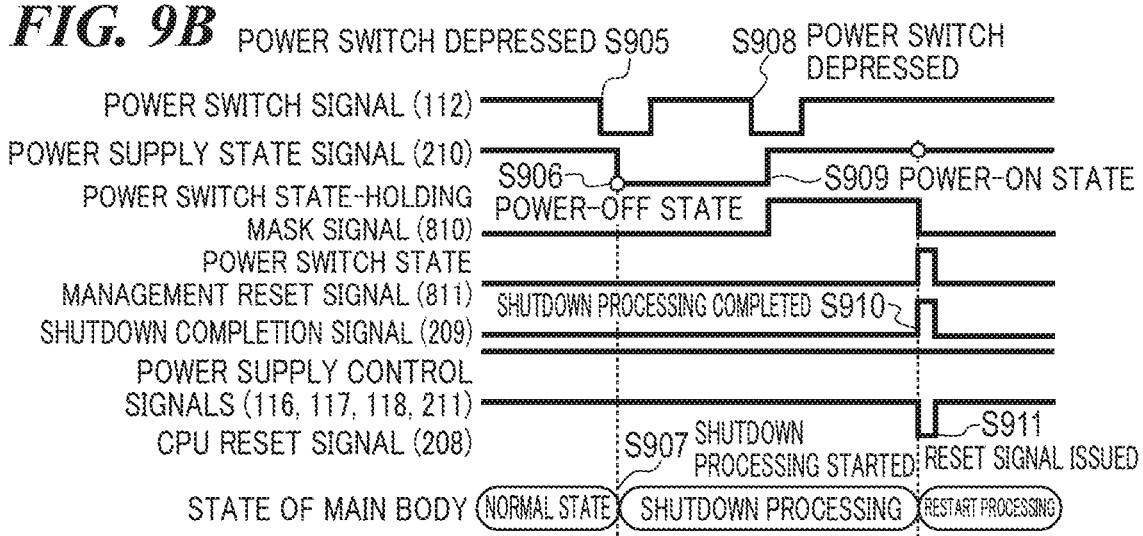
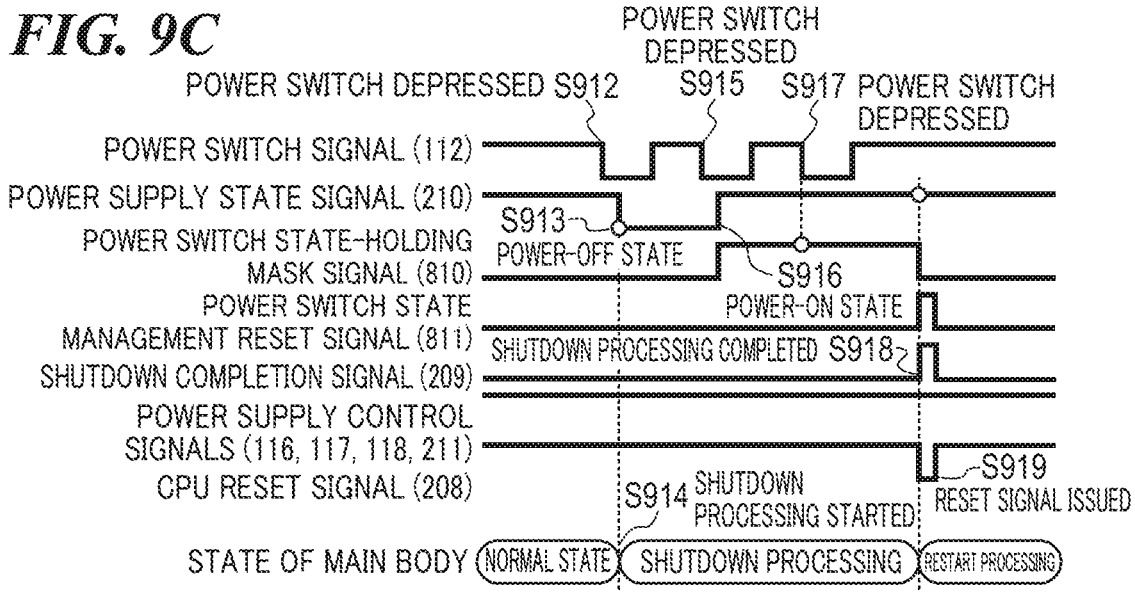

INFORMATION PROCESSING APPARATUS INCLUDING PUSH SWITCH, POWER SUPPLY CONTROL METHOD THEREFOR, AND STORAGE MEDIUM

BACKGROUND OF THE INVENTION

Field of the Invention

The present invention relates to an information processing apparatus, a power supply control method therefor, and a storage medium, and more particularly to an information processing apparatus including a push switch, a power supply control method therefor, and a storage medium.

Description of the Related Art

Power switches for powering on and off an information processing apparatus are roughly classified into an alternate-type power switch and a momentary-type power switch. The alternate-type power switch (push switch) is shifted to an on-state or off-state by a user pushing the switch, and even after the user removes his hand from the switch, the on-state or off-state is maintained. On the other hand, the momentary-type power switch is in an on-state only during being depressed by a user, and upon removal of the user's hand from the switch, the switch is shifted to an off-state.

Japanese Laid-Open Patent Publication (Kokai) No. 2002-73220 discloses an information processing apparatus including an alternate-type power switch. The information processing apparatus disclosed in Japanese Laid-Open Patent Publication (Kokai) No. 2002-73220 starts shutdown processing when the power switch is depressed by a user, thereby shifting the information processing apparatus to the off-state. Then, the information processing apparatus checks the state of the power switch when a predetermined time period elapses after the start of the shutdown processing, and if the power switch is in the on-state, the information processing apparatus is automatically started.

In Japanese Laid-Open Patent Publication (Kokai) No. 2002-73220, in a case where a maintenance operator desires to shut down and restart the information processing apparatus, the maintenance operator turns on the power switch immediately after turning off the power switch, whereby it is possible to automatically shut down and start the information processing apparatus. Therefore, the maintenance operator is not required to perform, after turning off the power switch, such an operation as will turn on the power switch again by estimating time of completion of shutdown processing. However, this restarting method described in Japanese Laid-Open Patent Publication (Kokai) No. 2002-73220 is predicated on the assumption that the power switch of an information processing apparatus is an alternate-type power switch, and hence cannot be applied to an information processing apparatus having a momentary-type power switch.

SUMMARY OF THE INVENTION

The present invention provides an information processing apparatus including a push switch, which is capable of switching between power-off processing and restart processing according to how a user depresses the power switch, a power supply control method therefor, and a storage medium.

In a first aspect of the present invention, there is provided an information processing apparatus including a push switch, the information processing apparatus starting shutdown processing and turning off the information processing apparatus when a user's operation is performed on the push switch, comprising a holding unit configured to hold information indicating that the push switch is operated by a user during the shutdown processing, and a processing unit configured to restart the information processing apparatus or not when at least part of the shutdown processing is completed, based on the information held in the holding unit.

In a second aspect of the present invention, there is provided a power supply control method for an information processing apparatus including a push switch, the information processing apparatus starting shutdown processing and turning off the information processing apparatus when a user's operation is performed on the push switch, comprising holding information indicating that the push switch is operated by a user during the shutdown processing, and restarting the information processing apparatus or not when at least part of the shutdown processing is completed, based on the held information.

In a third aspect of the present invention, there is provided a non-transitory computer-readable storage medium storing a computer executable program for executing a power supply control method for an information processing apparatus including a push switch, the information processing apparatus starting shutdown processing and turning off the information processing apparatus when a user's operation is performed on the push switch, wherein the power supply control method comprises holding information indicating that the push switch is operated by a user during the shutdown processing, and restarting the information processing apparatus or not when at least part of the shutdown processing is completed, based on the held information.

According to the present invention, in the information processing including the push switch, it is possible to switch between power-off processing and restart processing according to how the user depresses the power switch.

Further features of the present invention will become apparent from the following description of exemplary embodiments (with reference to the attached drawings).

BRIEF DESCRIPTION OF THE DRAWINGS

FIG. 4 is a block diagram showing the internal configuration of a power supply controller, appearing in FIG. 1, according to the first embodiment.

FIG. 8 is a block diagram showing the internal configuration of a power supply controller, appearing in FIG. 1, according to a second embodiment.

FIGS. 9A to 9C are timing diagrams of power supply control according to the second embodiment, which is performed by the power supply controller shown in FIG. 8.

DESCRIPTION OF THE EMBODIMENTS

The present invention will now be described in detail below with reference to the accompanying drawings showing embodiments thereof.

Figure 1:
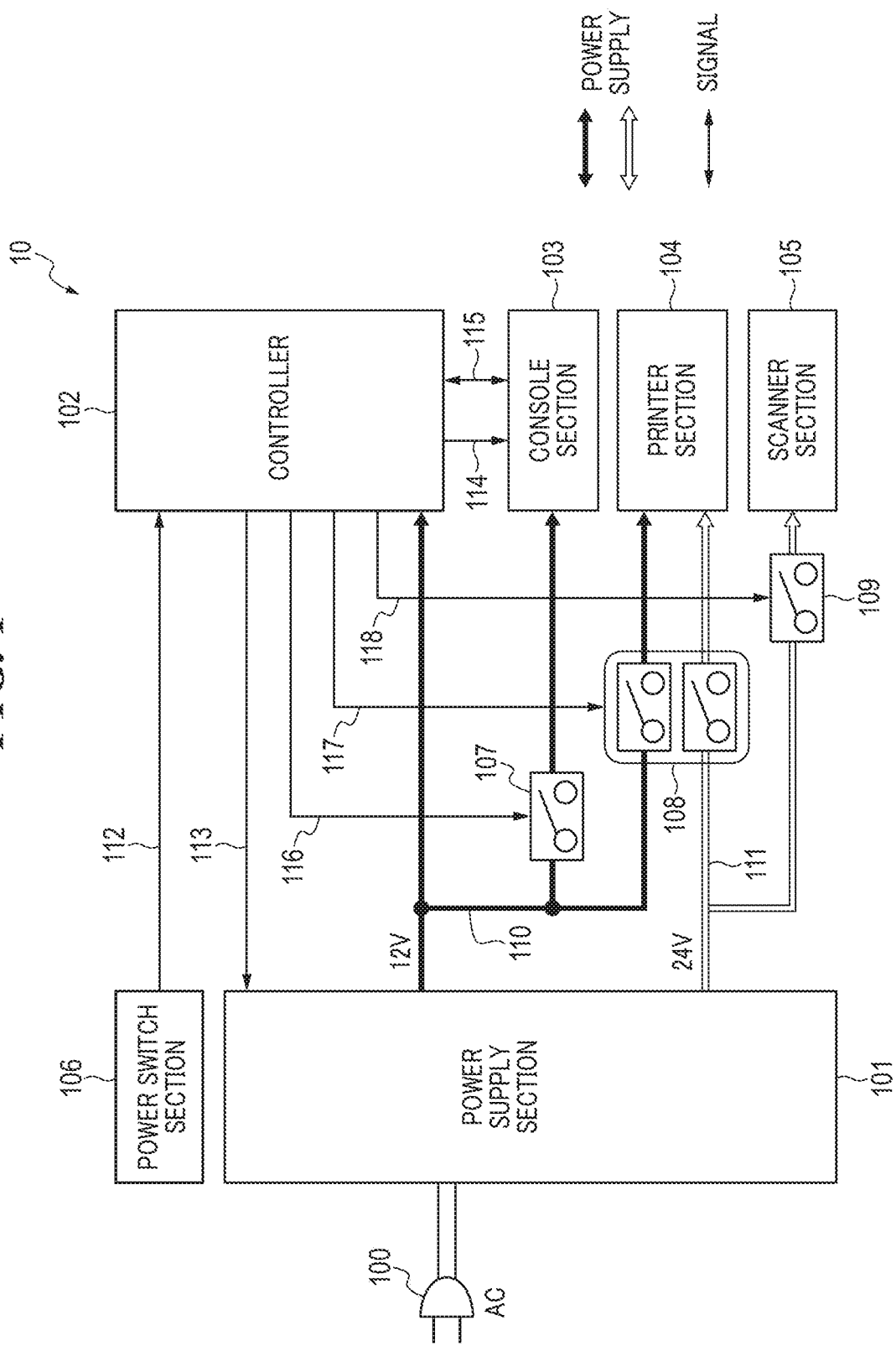
FIG. 1 is a schematic diagram of an image forming apparatus as an information processing apparatus according to embodiments of the present invention.

FIG. 1 is a schematic diagram of an image forming apparatus 10 as an information processing apparatus according to embodiments of the present invention. The image forming apparatus 10 includes a power supply section 101, a controller 102, a console section 103, a printer section 104, a scanner section 105, a power switch section 106, a console section power supply controller 107, a printer power supply controller 108, a scanner power supply controller 109, and an AC plug 100.

Referring to FIG. 1, the scanner section 105 optically reads an image from an original, and converts the read image to a digital image. The printer section 104 performs processing for forming an image on a sheet-type recording medium (sheet) e.g. by an electrophotographic method. Note that the recording method employed by the printer section 104 is not limited to the electrophotographic method, but any other suitable recoding method, such as an ink jet method and a heat transfer method, may be employed insofar as image processing can be performed on both sides of a sheet-type recording medium (e.g. a recording sheet). The controller 102 controls the overall operation of the image forming apparatus 10, and for example, the controller 102 controls the printer section 104 to perform image forming processing on an image read from an original by the scanner section 105 to perform a copy operation.

The console section 103 is connected to the controller 102. The console section 103 displays a state of the image forming apparatus 10 etc., using a method, described hereinafter with reference to FIG. 3, based on an LED control signal 114 from the controller 102, a console panel control signal 115, and a service switch signal 119. Further, the console section 103 notifies the controller 102 and a power supply controller 200, described hereinafter with reference to FIG. 2, of a user's operation on an operation liquid crystal panel unit 301 and a key section 305, described hereinafter with reference to FIG. 3.

The power switch section 106 is comprised of a push switch which is configured by hardware not to hold an on/off state and notifies the controller 102 of a state thereof via a power switch signal 112. The power supply section 101 is provided with the AC plug 100 and is configured to receive AC commercial power supply via the AC plug 100 inserted into an electrical outlet, not shown, outside the image forming apparatus 10. The power supply section 101, supplied with AC commercial power via the AC plug 100, is configured to supply electric power at respective desired voltages to the controller 102, the console section 103, the printer section 104, and the scanner section 105.

Note that although in the embodiments, described hereafter, 12-V power 110 and 24-V power 111 are generated by the power supply section 101, the output voltage is not particularly limited. Further, the power supply section 101 changes an operating state thereof based on a 24-V start signal 113 output from the controller 102. The console section power supply controller 107 controls on/off of power supply to the console section 103 based on a console section power supply control signal 116 output from the controller 102. The printer power supply controller 108 controls on/off of power supply to the printer section 104 based on a printer power supply control signal 117 output from the controller 102. The scanner power supply controller 109 controls on/off of power supply to the scanner section 105 based on a scanner power supply control signal 118 output from the controller 102.

Figure 2:
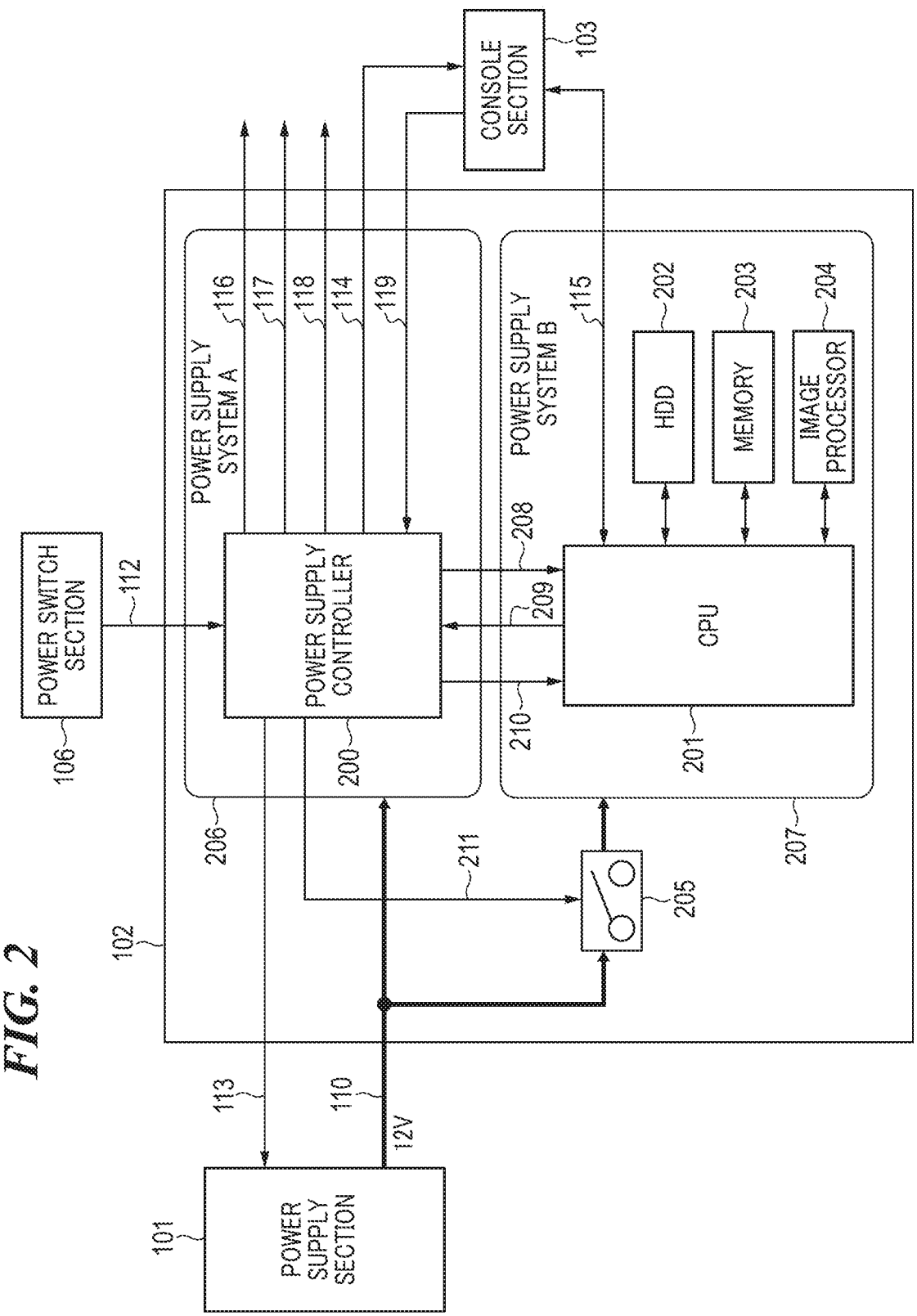
FIG. 2 is a block diagram showing the internal configuration of a controller appearing in FIG. 1 according to a first embodiment.

FIG. 2 is a block diagram showing the internal configuration of the controller 102 appearing in FIG. 1 according to a first embodiment.

The controller 102 is comprised of the power supply controller 200, a power supply system B power supply section 205, a CPU 201, an HDD 202, a memory 203, and an image processor 204.

The power supply controller 200 detects a change of the state of the power switch section 106, and switches the state of a power supply state signal 210 (on/off of the power supply state of the main body) to be transmitted to the CPU 201 based on a result of the detection. Further, the power supply controller 200 keeps track of shutdown processing executed by the CPU 201, via a shutdown completion signal 209. After termination of shutdown processing, the power supply controller 200 performs one of power-off processing using the power supply control signals (second processing) and restart processing using a CPU reset signal 208 (first processing).

The CPU 201 is a central processing unit that controls the overall operation of the image forming apparatus 10, and realizes functions, such as a copy function, a print function, and a FAX function, based on control programs stored in the HDD 202. The HDD 202 is a storage device for storing programs executed by the CPU 201, information on various settings related to the image forming apparatus 10, and so forth. The memory 203 is a volatile memory, such as a DDR and an SDRAM, and is a main memory for storing user data and so forth, generated by control programs and the like executed by the CPU 201. The image processor 204 is connected not only to the CPU 201, but also, although not shown in FIG. 2, to the printer section 104 and the scanner section 105. The image processor 204 performs image processing, such as color space conversion, based on image data read by the scanner section 105, converts the processed data to bitmap data, and outputs the bitmap data to the printer section 104.

Next, a description will be given of a power supply system of the image forming apparatus 10 with reference to FIG. 2. A power supply system A 206 is a power supply system for supplying power to the power supply controller 200. Power supply to the power supply system A 206 is never shut off in any power supply state insofar as AC commercial power is supplied from the AC plug 100, with a view to managing the power supply state of the whole image forming apparatus 10. A power supply system B 207 is a power supply system for supplying power to the CPU 201, the HDD 202, the memory 203, and the image processor 204. Control of on/off of power supply to the power supply system B 207 is realized by controlling the power supply system B power supply section 205 via a power supply system B power supply control signal 211 output from the power supply controller 200. The power supply system A 206 and the power supply system B 207 supply power in a case where the image forming apparatus 10 is in a normal state. Note that power supply to the power supply system B 207 is stopped when the image forming apparatus 10 is in a power-saving mode in which power consumption is reduced.

Figure 3:
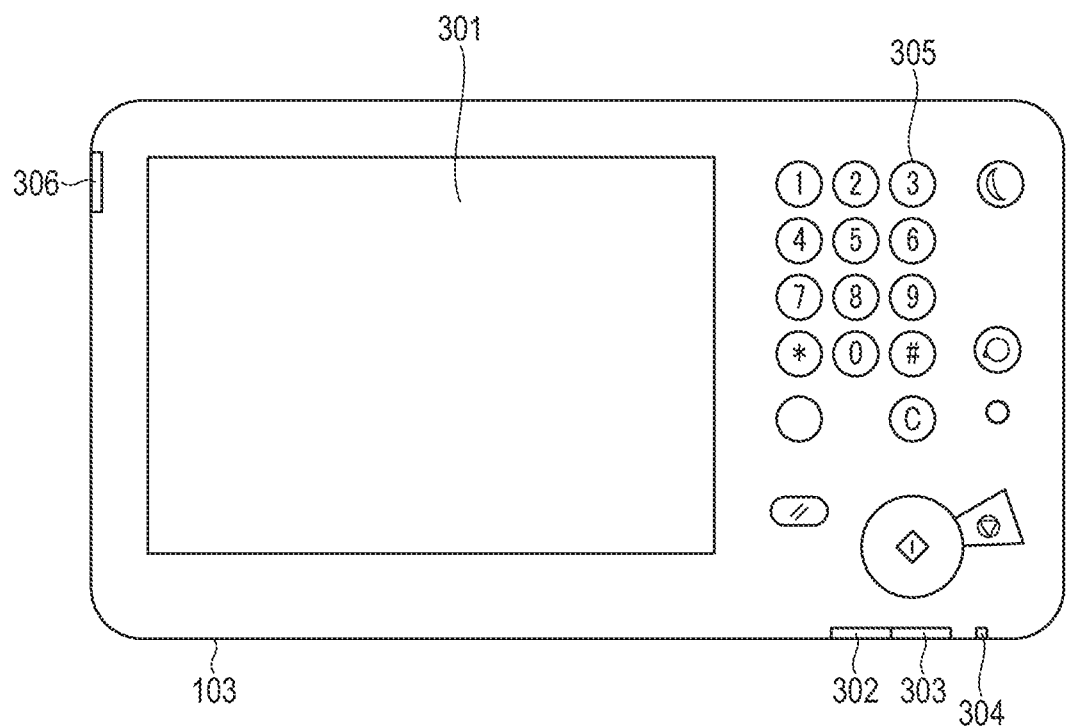
FIG. 3 is a view showing the appearance of a console section appearing in FIG. 1.

FIG. 3 is a view showing the appearance of the console section 103 appearing in FIG. 1. The console section 103 (user interface) is comprised of the operation liquid crystal panel unit 301, a processing-in-progress notification LED 302, an error notification LED 303, a main power LED 304, the key section 305, and a service switch 306.

The operation liquid crystal panel unit 301 is comprised of a liquid crystal panel and a touch panel. Further, the key section 305 is comprised of numeric keys, a start key, a power-saving button, and so forth. The processing-in-progress notification LED 302, the error notification LED 303, and the main power LED 304 are controlled by the controller 102 via the LED control signal 114, and notify a user of a state of the image forming apparatus 10. The operation liquid crystal panel unit 301 and the key section 305 notify the controller 102 and the power supply controller 200 that a user's operation is performed, by the console panel control signal 115. Further, the operation liquid crystal panel unit 301 displays image data received from the controller 102 on the liquid crystal panel. Further, the console section 103 (notification unit) notifies the controller 102 that the service switch 306 is depressed, via the service switch signal 119. Note that the service switch 306 is a switch operated to shift the image forming apparatus 10 to a maintenance mode mainly used when maintenance of the image forming apparatus 10 is performed, as described hereinafter as to a fourth embodiment.

FIG. 4 is a block diagram showing the internal configuration of the power supply controller 200, appearing in FIG. 1, according to the first embodiment. The power supply controller 200 is comprised of a power switch state-holding section 400 and a power state management section 401. The power switch section 106 is comprised of a push switch 106a and a peripheral circuit. Differently from a switch which holds the switch on-state or switch off-state by the switch itself, such as a rocker switch, the push switch 106a is a momentary switch which is held in the switch-on state only during being depressed and is shifted to the switch-off state when it is released. In the present embodiment, the push switch 106a has one terminal connected to GND, and the other terminal connected to the power switch state-holding section 400 and to the power supply section 101, not shown in FIG. 4, via a resistor 106b, and when the push switch 106a is depressed, the power switch signal 112 is delivered to the power switch state-holding section 400.

The power switch state-holding section 400 is comprised of an inverter 400a and a D flip-flop 400b. The power switch signal 112 is input, after being logically inverted, to a clock input terminal of the D flip-flop 400b. Further, an output from an output terminal $Q_1$ of the D flip-flop 400b is input to an input terminal D of the same, and an output from an output terminal $Q_2$ of the D flip-flop 400b is input to the power state management section 401 and the CPU 201 as the power supply state signal 210. With this, when the power switch state-holding section 400 detects that the push switch 106a of the power switch section 106 is being depressed based on the power switch signal 112, the power switch state-holding section 400 logically inverts and holds the output, and notifies the power state management section 401 and the CPU 201 of the output as the power supply state signal 210. Then, when the power state management section 401 receives a notification to the effect that shutdown processing is completed (hereinafter referred to as the "shutdown completion notification") from the CPU 201 via the shutdown completion signal 209, the power state management section 401 checks the state of the power supply state signal 210. As a result of the check, if the power supply state signal 210 is in a power-on state, the power state management section 401 issues the CPU reset signal 208 to the CPU 201. On the other hand, as a result of the check, if the power supply state signal 210 is in a power-off state, the power state management section 401 switches the state of each of the power supply control signals 116, 117, 118, and 211 to the power-off state, and stops power supply to the components of the image forming apparatus 10. Upon detection of the power-off state of the power supply state signal 210, the CPU 201 starts shutdown processing of the image forming apparatus 10. The CPU 201 sends the shutdown completion notification to the power state management section 401 via the shutdown completion signal 209 when the shutdown processing is completed. Further, the CPU 201 starts restart processing of the image forming apparatus 10 when the CPU 201 receives the CPU reset signal 208.

Figure 5A:
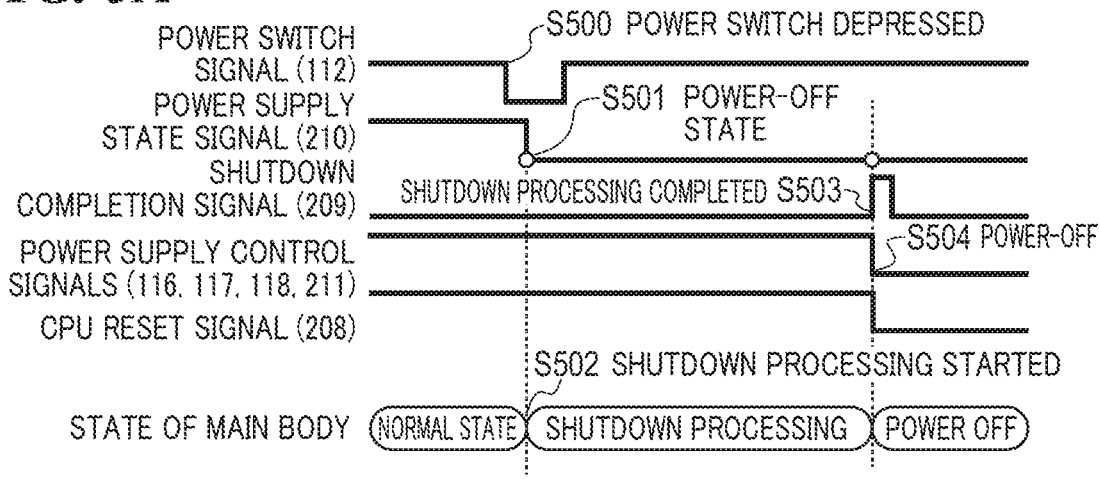
FIGS. 5A to 5C are timing diagrams of power supply control performed by the power supply controller shown in FIG. 4 according to the first embodiment.
Figure 5B:
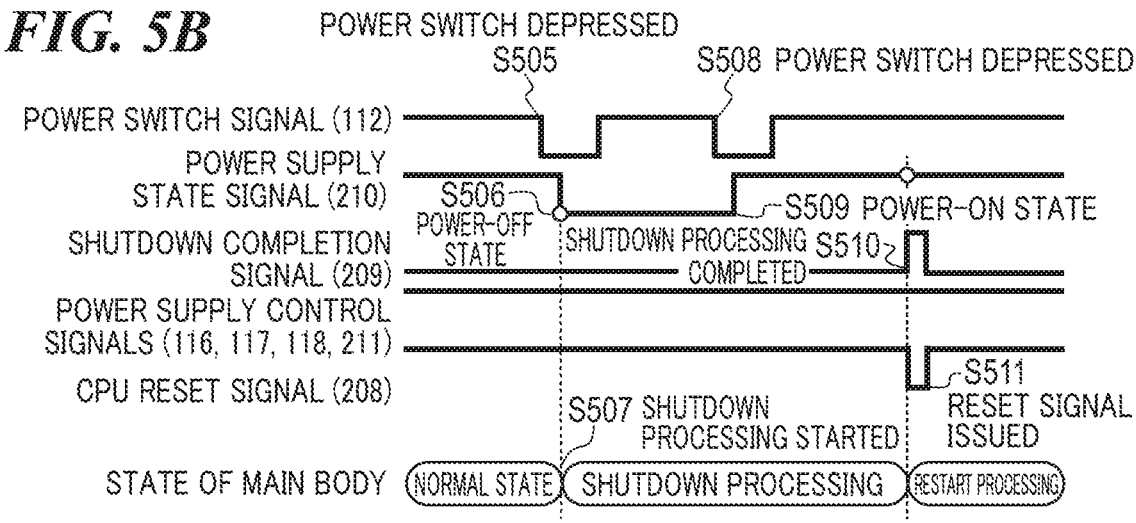
Figure 5C:
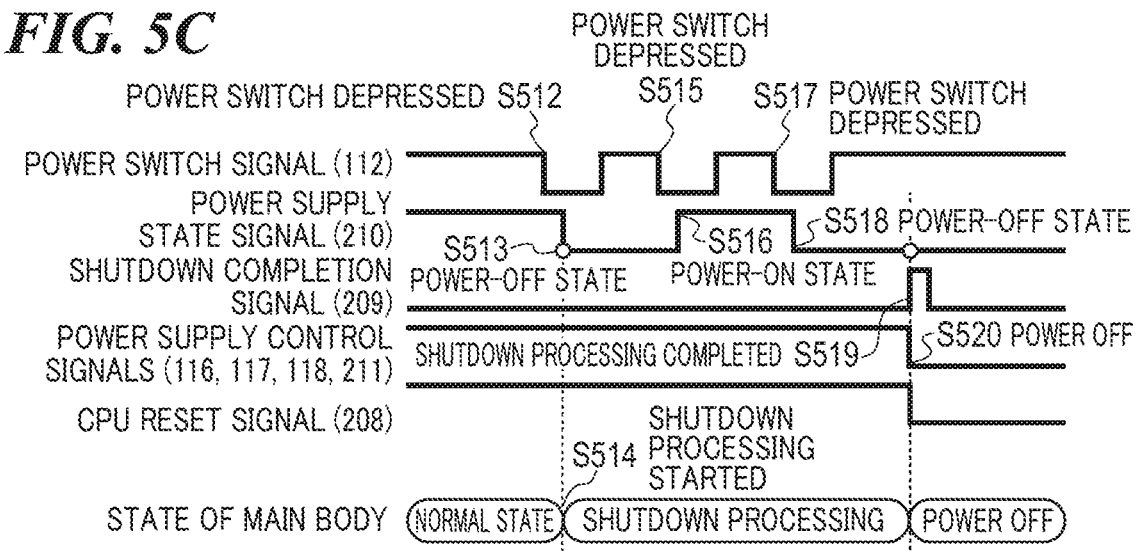

FIGS. 5A to 5C are timing diagrams of power supply control according to the first embodiment, which is performed by the power supply controller 200 shown in FIG. 4.

FIG. 5A is a timing diagram of power supply control according to the first embodiment in a case where the push switch 106a of the power switch section 106 is depressed only once. When the push switch 106a of the power switch section 106 is depressed (a first user's operation is performed) (step S500), the power switch state-holding section 400 changes the power supply state signal 210 into the power-off state (step S501). When the power supply state signal 210 is changed into the power-off state, the CPU 201 starts shutdown processing of the image forming apparatus 10 (step S502). When the shutdown processing of the image forming apparatus 10 is completed, the CPU 201 sends the shutdown completion notification to the power state management section 401 via the shutdown completion signal 209 (step S503). Upon receipt of the shutdown completion notification, the power state management section 401 checks the power supply state signal 210. Since the power supply state signal 210 is in the power-off state, the power state management section 401 switches the state of each of the power supply control signals 116, 117, 118, and 211 to the power-off state, and stops power supply to the components of the image forming apparatus 10 (step S504).

Next, cases where the push switch 106a of the power switch section 106 is depressed a plurality of times will be described with reference to FIGS. 5B and 5C.

FIG. 5B is a timing diagram of power supply control according to the first embodiment in a case where the push switch 106a of the power switch section 106 is depressed twice. When the push switch 106a of the power switch section 106 is depressed (the first user's operation is performed) (step S505), the power switch state-holding section 400 changes the power supply state signal 210 into the power-off state (step S506). When the power supply state signal 210 is changed into the power-off state, the CPU 201 starts shutdown processing of the image forming apparatus 10 (step S507). When the push switch 106a of the power switch section 106 is depressed again during the shutdown processing (a second user's operation is performed) (step S508), the power switch state-holding section 400 changes the power supply state signal 210 into the power-on state (step S509). When the shutdown processing of the image forming apparatus 10 is completed, the CPU 201 sends the shutdown completion notification to the power state management section 401 via the shutdown completion signal 209 (step S510). Upon receipt of the shutdown completion notification, the power state management section 401 checks the power supply state signal 210. Since the power supply state signal 210 is in the power-on state in FIG. 5B, the power state management section 401 issues the CPU reset signal 208 to the CPU 201 (step S511). Upon receipt of the CPU reset signal 208, the CPU 201 executes restart processing of the image forming apparatus 10.

FIG. 5C is a timing diagram of power supply control according to the first embodiment in a case where the push switch 106a of the power switch section 106 is depressed three times. When the push switch 106a of the power switch section 106 is depressed (the first user's operation is performed) (step S512), the power switch state-holding section 400 changes the power supply state signal 210 into the power-off state (step S513). When the power supply state signal 210 is changed into the power-off state, the CPU 201 starts shutdown processing of the image forming apparatus 10 (step S514). When the push switch 106a of the power switch section 106 is depressed again during the shutdown processing (the second user's operation is performed) (step S515), the power switch state-holding section 400 changes the power supply state signal 210 into the power-on state (step S516). When the push switch 106a of the power switch section 106 is further depressed (the second user's operation is performed) (step S517), the power switch state-holding section 400 changes the power supply state signal 210 into the power-off state again (step S518). When the shutdown processing of the image forming apparatus 10 is completed, the CPU 201 sends the shutdown completion notification to the power state management section 401 via the shutdown completion signal 209 (step S519). Upon receipt of the shutdown completion notification, the power state management section 401 checks the power supply state signal 210. Since the power supply state signal 210 is in the power-off state in FIG. 5C, the power state management section 401 switches the state of each of the power supply control signals 116, 117, 118, and 211 to the power-off state, and stops power supply to the components of the image forming apparatus 10 (step S520).

In a case where the push switch 106a of the power switch section 106 is depressed four times or more, if the push switch 16a is depressed an odd number of times, similarly to the case where the push switch 106a of the power switch section 106 is depressed once or three times, when shutdown processing is completed, power supply to the components of the image forming apparatus 10 is stopped. On the other hand, if the push switch 16a is depressed an even number of times, similarly to the case where the push switch 106a of the power switch section 106 is depressed twice, when shutdown processing is completed, restart processing of the image forming apparatus 10 is executed.

Figure 6:
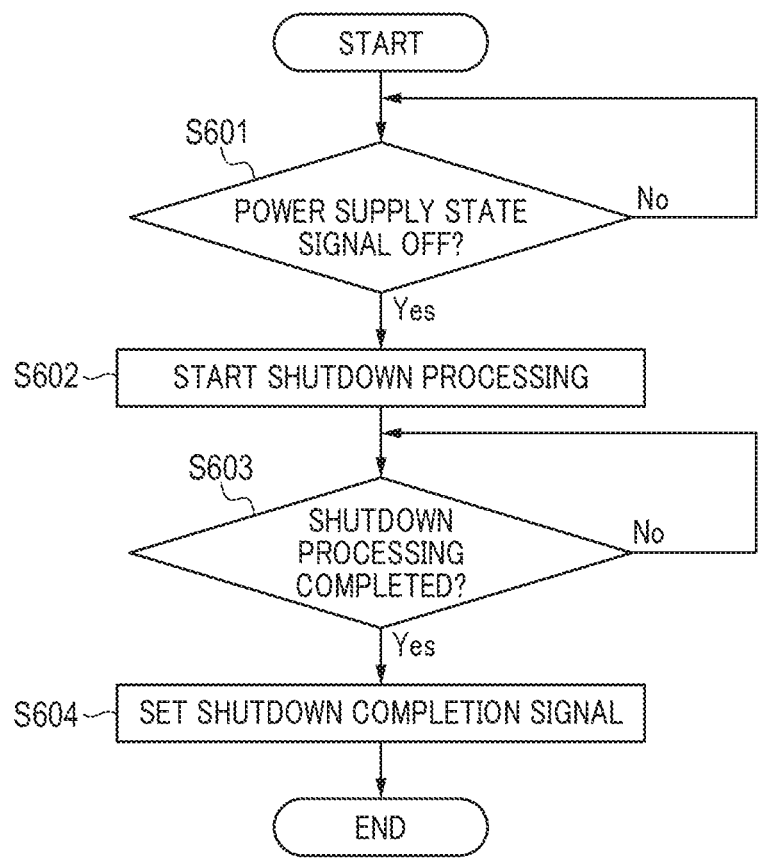
FIG. 6 is a flowchart of a shutdown process according to the first embodiment, which is performed by a CPU appearing in FIG. 1.

FIG. 6 is a flowchart of a shutdown process according to the first embodiment, which is performed by the CPU 201 appearing in FIG. 1. The present process is started when the image forming apparatus 10 enters the normal state.

First, the CPU 201 determines whether or not the power supply state signal 210 is in the power-off state (step S601). If the power supply state signal 210 is not in the power-off state (No to the step S601), the CPU 201 waits until the power supply state signal 210 is changed into the power-off state. If the power supply state signal 210 is in the power-off state (Yes to the step S601), the CPU 201 starts shutdown processing of the image forming apparatus 10 (step S602). When the shutdown processing is started, the CPU 201 determines whether or not the shutdown processing is completed (step S603). If the shutdown processing is not completed (No to the step S603), the CPU 201 waits until the shutdown processing is completed. If the shutdown processing is completed (Yes to the step S603), the CPU 201 sets the shutdown completion signal 209, and sends the shutdown completion notification to the power state management section 401 (step S604), followed by terminating the present process.

Figure 7:
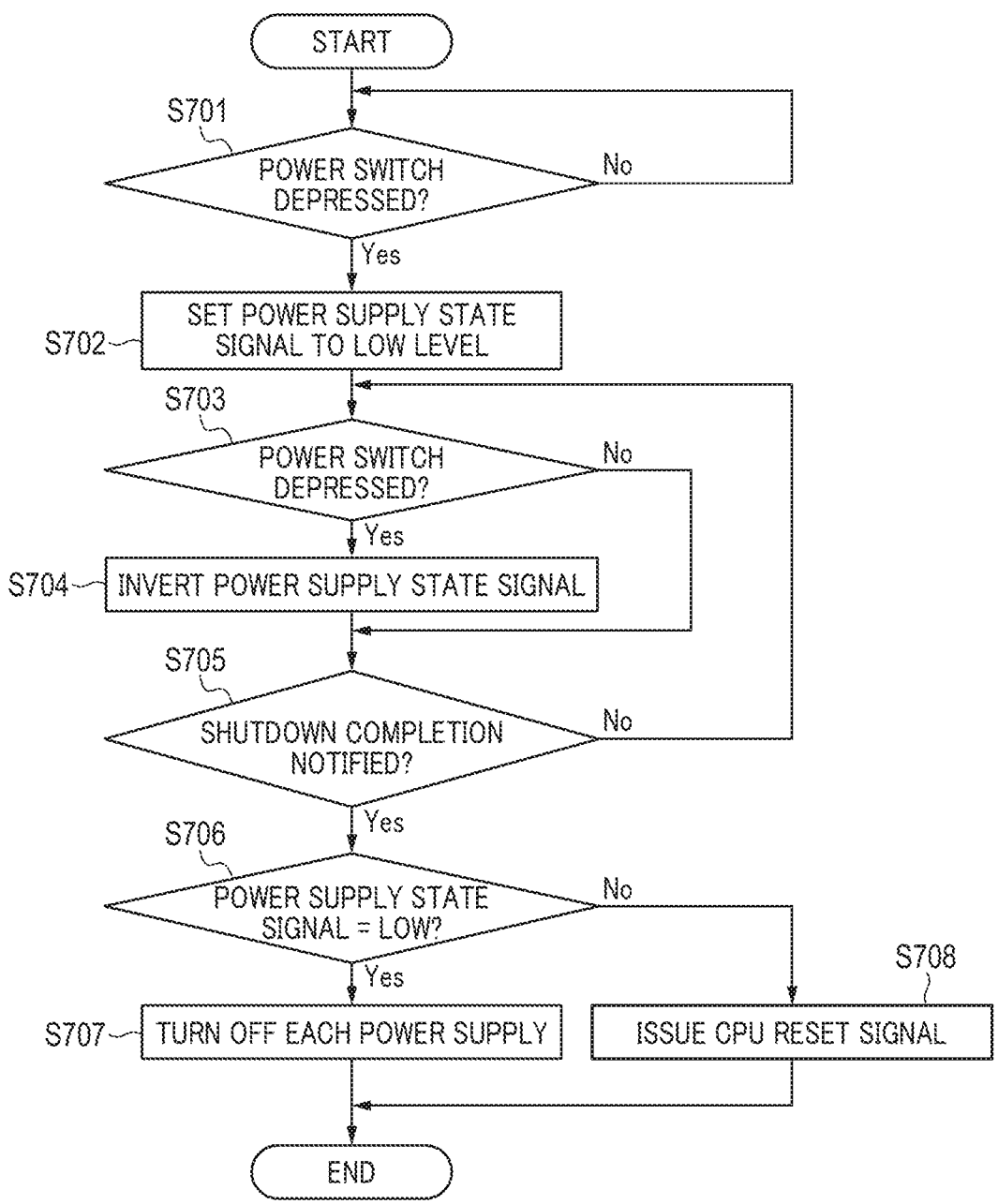
FIG. 7 is a flowchart of a power supply control process according to the first embodiment, which is performed by the power supply controller shown in FIG. 4.

FIG. 7 is a flowchart of a power supply control process according to the first embodiment, which is performed by the power supply controller 200 shown in FIG. 4. The present process is started when the image forming apparatus 10 enters the normal state.

First, in a step S701, the power switch state-holding section 400 determines whether or not the push switch 106a of the power switch section 106 has been depressed (this means "the power switch state-holding section 400 monitors the power supply switch signal 112 for detection of depression of the push switch 106a of the power switch section 106", and similar phases in the following have the same meaning). If it is determined that the push switch 106a of the power switch section 106 has not been depressed (this means "the power switch state-holding section 400 has not detected depression of the push switch 106a of the power switch section 106", and similar phases in the following have the same meaning) (No to the step S701), the power switch state-holding section 400 waits until the push switch 106a of the power switch section 106 is depressed. If it is determined that the push switch 106a of the power switch section 106 has been depressed (this means "the power switch state-holding section 400 has detected depression of the push switch 106a of the power switch section 106", and similar phases in the following have the same meaning) (Yes to the step S701), the power switch state-holding section 400 sets the power supply state signal 210 to low level (power-off state) (step S702). After that, in a step S703, the power switch state-holding section 400 determines again whether or not the push switch 106a of the power switch section 106 has been depressed. If it is determined that the push switch 106a of the power switch section 106 has not been depressed (No to the step S703), the process proceeds to a step S705 without changing the state of the power supply state signal 210. If it is determined that the push switch 106a of the power switch section 106 has been depressed (Yes to the step S703), the power switch state-holding section 400 inverts the power supply state signal 210 (step S704). After that, the process proceeds to the step S705. In the step S705, the power state management section 401 determines via the shutdown completion signal 209 whether or not the shutdown completion notification has been received (this means "the power state management section 401 monitors the shutdown completion signal 209 for reception of the shutdown completion notification, and similar phases in the following have the same meaning). If no shutdown completion notification has been received (No to the step S705), the process returns to the step S703, and the power switch state-holding section 400 determines again whether or not the push switch 106a of the power switch section 106 has been depressed. If the shutdown completion notification has been received (Yes to the step S705), the process proceeds to a step S706.

In the step S706, it is determined whether or not the power supply state signal 210 is at low level (in the power-off state) in the power state management section 401. If it is determined that the power supply state signal 210 is at low level (in the power-off state) (Yes to the step S706), the power state management section 401 switches the state of each of the power supply control signals 116, 117, 118, and 211 to the power-off state, and stops power supply to the components of the image forming apparatus 10 (step S707), followed by terminating the present process. On the other hand, if it is determined that the power supply state signal 210 is at high level (power-on state) (No to the step S706), the power state management section 401 issues the CPU reset signal 208 (step S708), followed by terminating the present process.

In the present embodiment, during shutdown processing, the user is notified of whether the image forming apparatus 10 is to be restarted or power supply thereto is to be stopped after completion of the shutdown processing. Now, a description will be given of operations performed by the operation liquid crystal panel unit 301, the processing-in-progress notification LED 302, the error notification LED 303, and the main power LED 304 (notification unit) of the console section 103, when the above-mentioned notification is performed.

In a case where the power supply state signal 210 is at low level (power supply is to be stopped after completion of shutdown processing) during shutdown processing, the main power LED 304 provided on the console section 103 is blinked, and the error notification LED 303 and the processing-in-progress notification LED 302 are turned off. That is, the user is notified that power supply is to be stopped after completion of shutdown processing. On the other hand, in a case where the power supply state signal 210 is at high level (restart processing is to be performed after completion of shutdown processing) during shutdown processing, the main power LED 304 and the error notification LED 303 provided on the console section 103 are alternately blinked, and the processing-in-progress notification LED 302 is turned off. That is, the user is notified that restart processing is to be performed after completion of shutdown processing.

Note that the above-mentioned notification method is described only by way of example, but any other suitable method may be used insofar as it enables a user viewing the console section 103 of the image forming apparatus 10 during shutdown processing to distinguish between the two states, i.e. whether restart processing is to be performed or power supply is to be stopped after completion of shutdown processing. For example, to make it possible to distinguish between the above-mentioned two states, a notification method may be employed in which a message of "shutdown in progress" or "restart in progress" is displayed on the liquid crystal panel provided on the operation liquid crystal panel unit 301.

As described above, according to the present embodiment, it is possible to give a restart instruction without waiting until the power of the main body of the image forming apparatus 10 provided with the power switch section 106, which is the push switch, is completely turned off. This eliminates the user's waiting time and makes it possible to improve the usability.

Next, a description will be given of a second embodiment of the present invention. The present embodiment is the same as the first embodiment in the basic operations in which the state of the power supply state signal 210 is checked when shutdown processing of the image forming apparatus 10 is completed and whether or not to restart the image forming apparatus 10 is determined according to the checked state. In the following description, the same components as those in the first embodiment are denoted by the same reference numerals, and redundant description thereof is omitted.

FIG. 8 is a block diagram showing the internal configuration of the power supply controller 200, according to the second embodiment. The power supply controller 200 in the present embodiment differs from that in the first embodiment in that the power supply controller 200 includes a power switch state-holding section 800 in place of the power switch state-holding section 400, a power state management section 801 in place of the power state management section 401, and further includes a power switch state management section 802. That is, the present embodiment differs from the first embodiment in that whether or not the power switch state-holding section 800 holds the power supply state is controlled by the power switch state management section 802. More specifically, the power switch state-holding section 800 is the same as the power switch state-holding section 400 in that the power switch state-holding section 800 is comprised of an inverter 800a and a D flip-flop 800b, and the power switch signal 112 is input via the inverter 800a, but differs from the power switch state-holding section 400 in that a power switch state-holding mask signal 810 is input from the power switch state management section 802.

The power switch state management section 802 is connected to the power switch state-holding section 800, and controls whether or not the power switch state-holding section 800 holds the power supply state, using the power switch state-holding mask signal 810. Further, the power switch state management section 802 switches the power switch state-holding mask signal 810 based on the power supply state signal 210. Further, upon receipt of a power switch state management reset signal 811 from the power state management section 801, the power switch state management section 802 is returned to the initial state.

FIGS. 9A to 9C are timing diagrams of power supply control according to the second embodiment, which is performed by the power supply controller 200 shown in FIG. 8.

FIG. 9A is a power supply control timing diagram in a case where the push switch 106a of the power switch section 106 is depressed only once in the present embodiment. The power supply control performed in the case where the push switch 106a of the power switch section 106 is depressed only once (step S900) is the same as that in the first embodiment. That is, when shutdown processing of the image forming apparatus 10 is completed (step S903), the power state management section 801 switches the state of each of the power supply control signals 116, 117, 118, and 211 to the power-off state. With this, the power state management section 801 stops power supply to the components of the image forming apparatus 10 (step S904).

Next, cases where the push switch 106a of the power switch section 106 is depressed a plurality of times in the present embodiment will be described with reference to FIGS. 9B and 9C.

FIG. 9B is a power supply control timing diagram in a case where the push switch 106a of the power switch section 106 is depressed twice in the present embodiment.

When the push switch 106a of the power switch section 106 is depressed (step S905), the power switch state-holding section 800 changes the power supply state signal 210 into the power-off state (step S906). When the power supply state signal 210 is changed into the power-off state, the CPU 201 starts shutdown processing of the image forming apparatus 10 (step S907). When the push switch 106a of the power switch section 106 is depressed again during the shutdown processing (step S908), the power switch state-holding section 800 changes the power supply state signal 210 into the power-on state (step S909). When the power supply state signal 210 is changed into the power-on state, the power switch state-management section 802 sets the power switch state-holding mask signal 810 to high level. When the shutdown processing of the image forming apparatus 10 is completed, the CPU 201 sends the shutdown completion notification to the power state management section 801 via the shutdown completion signal 209 (step S910). Upon receipt of the shutdown completion notification, the power state management section 801 checks the power supply state signal 210. Since the power supply state signal 210 is in the power-on state in FIG. 9B, the power state management section 801 issues the CPU reset signal 208 to the CPU 201 (step S911). Further, the power state management section 801 issues the power switch state management reset signal 811 to the power switch state management section 802. Upon receipt of the power switch state management reset signal 811, the power switch state management section 802 sets the power switch state-holding mask signal 810 to low level. Upon receipt of the CPU reset signal 208, the CPU 201 executes restart processing of the image forming apparatus 10.

FIG. 9C is a power supply control timing diagram in a case where the push switch 106a of the power switch section 106 is depressed three times in the present embodiment.

When the push switch 106a of the power switch section 106 is depressed (step S912), the power switch state-holding section 800 changes the power supply state signal 210 into the power-off state (step S913). When the power supply state signal 210 is changed into the power-off state, the CPU 201 starts shutdown processing of the image forming apparatus 10 (step S914). When the push switch 106a of the power switch section 106 is depressed again during the shutdown processing (step S915), the power switch state-holding section 800 changes the power supply state signal 210 into the power-on state (step S916). When the power supply state signal 210 is changed into the power-on state, the power switch state management section 802 sets the power switch state-holding mask signal 810 to high level. Even when the push switch 106a of the power switch section 106 is further depressed (step S917), since the power switch state-holding mask signal 810 is at high level, the power switch state-holding section 800 does not change the power supply state signal 210. When the shutdown processing of the image forming apparatus 10 is completed, the CPU 201 sends the shutdown completion notification to the power state management section 801 via the shutdown completion signal 209 (step S918). Upon receipt of the shutdown completion notification, the power state management section 801 checks the power supply state signal 210. Since the power supply state signal 210 is in the power-on state in FIG. 9C, the power state management section 801 issues the CPU reset signal 208 to the CPU 201 (step S919). Further, the power state management section 801 issues the power switch state management reset signal 811 to the power switch state management section 802. Upon receipt of the power switch state management reset signal 811, the power switch state management section 802 sets the power switch state-holding mask signal 810 to low level. Upon receipt of the CPU reset signal 208, the CPU 201 executes restart processing of the image forming apparatus 10.

In the present embodiment, in a case where the push switch 106a of the power switch section 106 is depressed four times or more, similarly to the cases where the push switch 106a of the power switch section 106 is depressed twice and three times, after shutdown processing is completed, the image forming apparatus 10 is restarted. Further, the present embodiment differs from the first embodiment in that after the push switch 106a of the power switch section 106 is depressed twice, the image forming apparatus 10 is restarted after completion of shutdown processing regardless of an odd-number or even-number of times of depression of the push switch 106a of the power switch section 106. Further, in the present embodiment, after the push switch 106a of the power switch section 106 is depressed twice, the image forming apparatus 10 is restarted after completion of shutdown processing even when any operation (such as a long-pressing operation) is performed on the push switch 106a of the power switch section 106.

Figure 10:
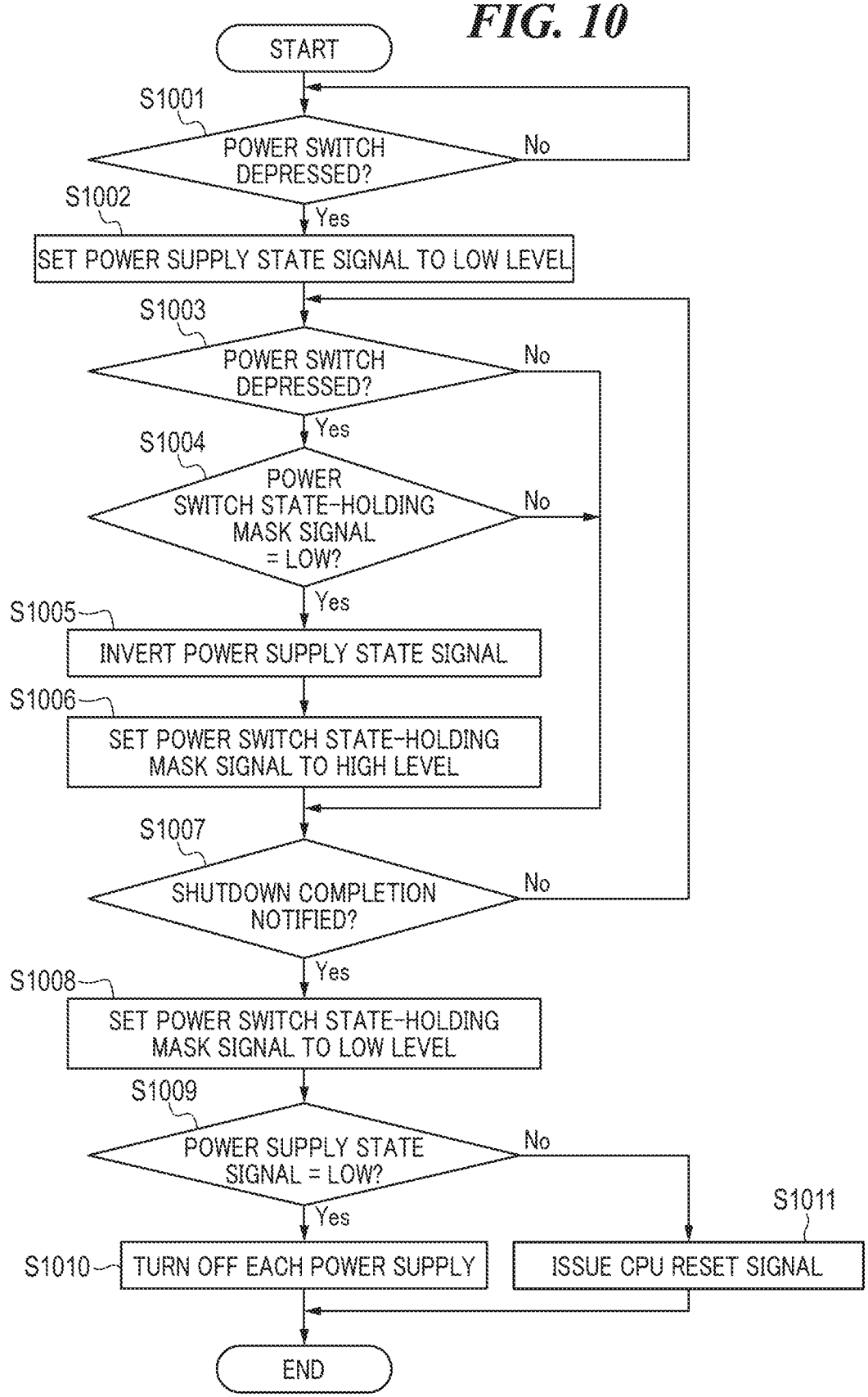
FIG. 10 is a flowchart of a power supply control process according to the second embodiment, which is performed by the power supply controller shown in FIG. 8.

FIG. 10 is a flowchart of a power supply control process according to the second embodiment, which is performed by the power supply controller 200 shown in FIG. 8. The present process is started when the image forming apparatus 10 enters the normal state.

First, in a step S1001, the power switch state-holding section 800 determines whether or not the push switch 106a of the power switch section 106 has been depressed.

If it is determined that the push switch 106a of the power switch section 106 has not been depressed (No to the step S1001), the power switch state-holding section 800 waits until the push switch 106a of the power switch section 106 is depressed. If it is determined that the push switch 106a of the power switch section 106 has been depressed (Yes to the step S1001), the power switch state-holding section 800 sets the power supply state signal 210 to low level (power-offstate) (step S1002).

After that, in a step S1003, the power switch state-holding section 800 determines again whether or not the push switch 106a of the power switch section 106 has been depressed. If it is determined that the push switch 106a of the power switch section 106 has not been depressed (No to the step S1003), the process proceeds to a step S1007 without changing the state of the power supply state signal 210 from low level. If it is determined that the push switch 106a of the power switch section 106 has been depressed (Yes to the step S1003), the process proceeds to a step S1004.

In the step S1004, it is determined whether or not the power switch state-holding mask signal 810 is at low level in the power switch state-holding section 800. If it is determined that the power switch state holding mask signal 810 is not at low level (No to the step S1004), the process proceeds to the step S1007. If it is determined that the power switch state-holding mask signal 810 is at low level (Yes to the step S1004), the power switch state-holding section 800 inverts the power supply state signal 210 (step S1005). After that, the power switch state management section 802 sets the power switch state-holding mask signal 810 to high level (step S1006). Then, the process proceeds to the step S1007.

In the step S1007, the power state management section 801 determines via the shutdown completion signal 209 whether or not the shutdown completion notification has been received. If no shutdown completion notification has been received via the shutdown completion signal 209 (No to the step S1007), the process returns to the step S1003, and the power switch state-holding section 800 determines again whether or not the push switch 106a of the power switch section 106 has been depressed. If the shutdown completion notification has been received via the shutdown completion signal 209 (Yes to the step S1007), the power switch state management section 802 sets the power switch state-holding mask signal 810 to low level (step S1008), and then the process proceeds to a step S1009.

In the step S1009, it is determined whether or not the power supply state signal 210 is at low level (in the power-off state) in the power state management section 801. If it is determined that the power supply state signal 210 is at low level (in the power-off state) (Yes to the step S1009), the power state management section 801 switches the state of each of the power supply control signals 116, 117, 118, and 211 to the power-off state. With this, the power state management section 801 stops power supply to the components of the image forming apparatus 10 (step S1010), followed by terminating the present process. On the other hand, if it is determined that power supply state signal 210 is at high level (in the power-on state) (No to the step S1009), the power state management section 801 issues the CPU reset signal 208 (step S1011), followed by terminating the present process.

The operation of the CPU 201 is the same as in the shutdown process, shown in FIG. 6, according to the first embodiment. Further, the display on a display unit concerning whether the image forming apparatus 10 is to be restarted or power supply thereto is to be stopped after completion of shutdown processing is the same as in the first embodiment.

As described above, according to the present embodiment, it is possible to give a restart instruction without waiting until the power of the main body of the image forming apparatus 10 provided with the power switch section 106, which is the push switch, is completely turned off. This eliminates the user's waiting time and makes it possible to improve the usability.

Next, a description will be given of a third embodiment of the present invention. The present embodiment is the same as the first and second embodiments in the basic operations in which the state of the power supply state signal 210 is checked when shutdown processing of the image forming apparatus 10 is completed and whether or not to restart the image forming apparatus 10 is determined according to the checked state.

Figure 11:
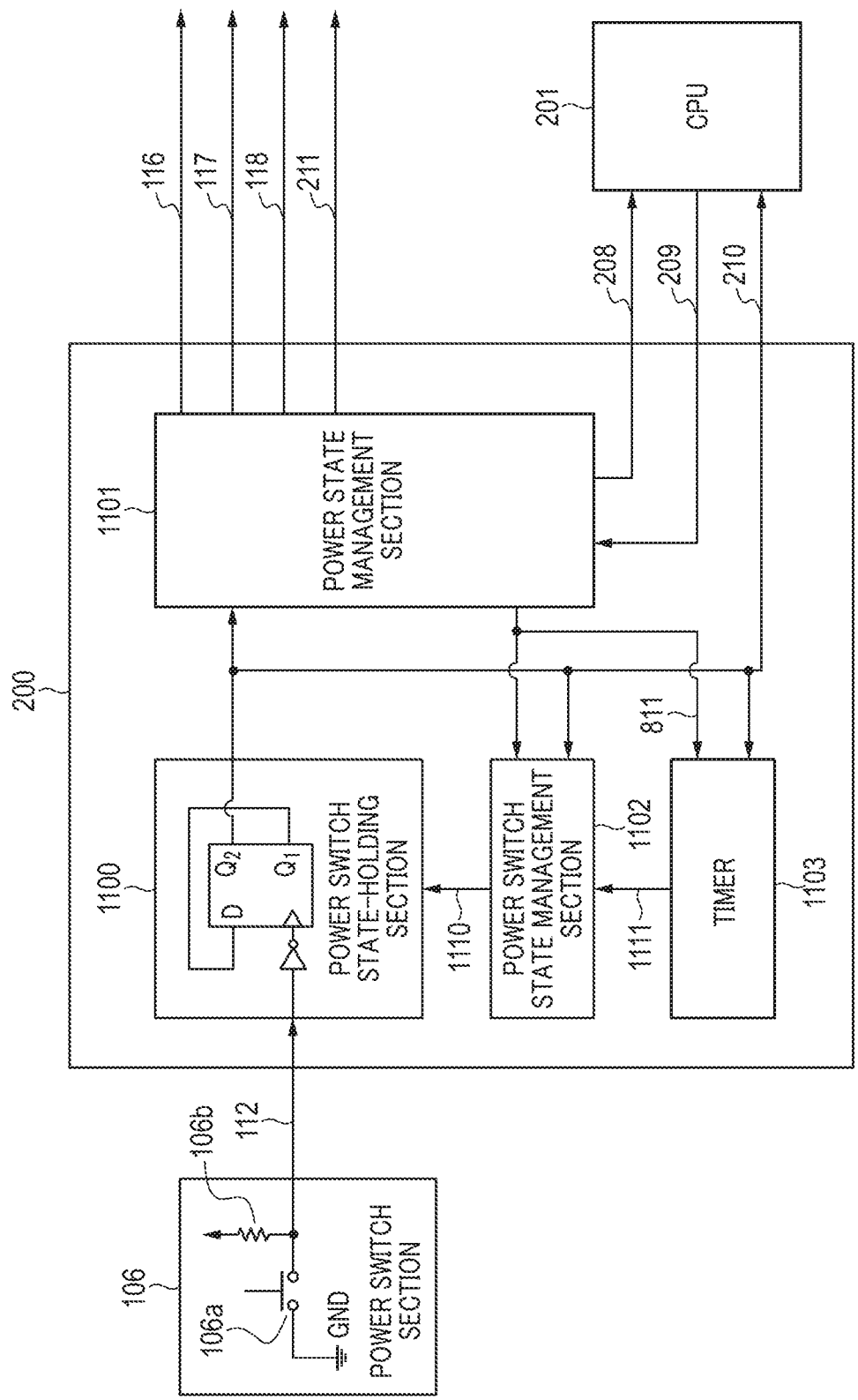
FIG. 11 is a block diagram showing the internal configuration of a power supply controller, appearing in FIG. 1, according to a third embodiment.

FIG. 11 is a block diagram showing the internal configuration of the power supply controller 200 according to the third embodiment. The power supply controller 200 in the present embodiment differs from that in the second embodiment in the following points: First, the power supply controller 200 includes a power switch state-holding section 1100 in place of the power switch state-holding section 800, a power state management section 1101 in place of the power state management section 801, and a power switch state management section 1102 in place of the power switch state management section 802. Further, the power supply controller 200 includes a timer 1103. That is, the present embodiment differs from the second embodiment in that whether or not the power switch state-holding section 1100 holds the power supply state is controlled not only by the power switch state management section 1102, but also by the timer 1103.

The timer 1103 is connected to the power switch state-holding section 1100 and the power switch state management section 1102, and stars counting when the power supply state signal 210 is changed into the power-off state. Further, the timer 1103 notifies the power switch state management section 1102 of a count value 1111 of the timer 1103. Further, upon receipt of the power switch state management reset signal 811 from the power state management section 1101, the timer 1103 is reset to the initial state.

The power switch state management section 1102 is connected to the timer 1103 and the power switch state-holding section 1100, and controls whether or not the power switch state-holding section 1100 holds the power supply state, using a power switch state-holding mask signal 1110. The power switch state-holding mask signal 1110 is controlled based on the power supply state signal 210 and the count value 1111. Further, upon receipt of the power switch state management reset signal 811 from the power state management section 1101, the power switch state management section 1102 is returned to the initial state.

Figure 12A:
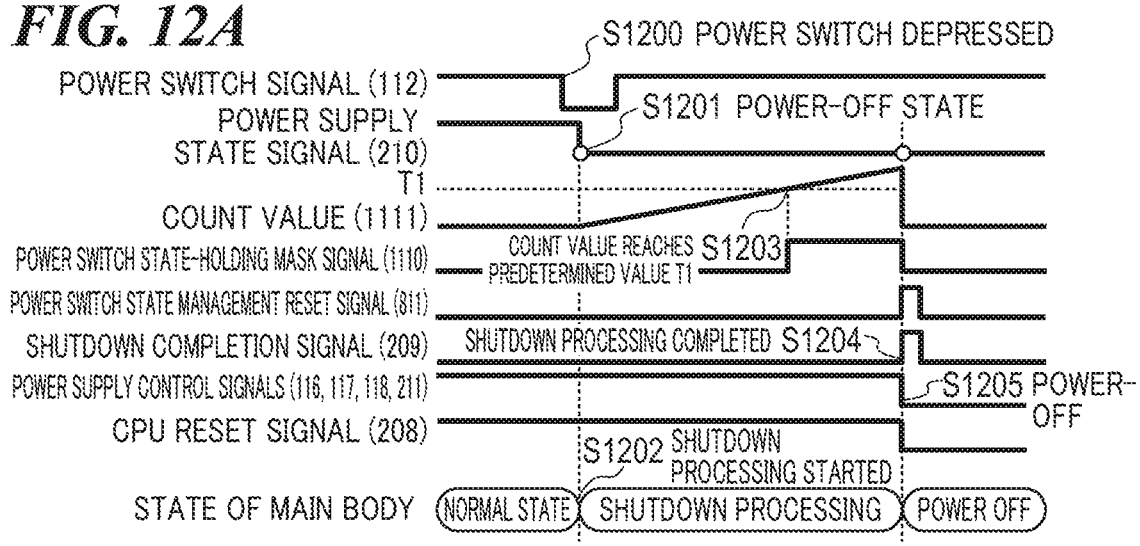
FIGS. 12A to 12C are timing diagrams of power supply control according to the third embodiment, which is performed by the power supply controller shown in FIG. 11.
Figure 12B:
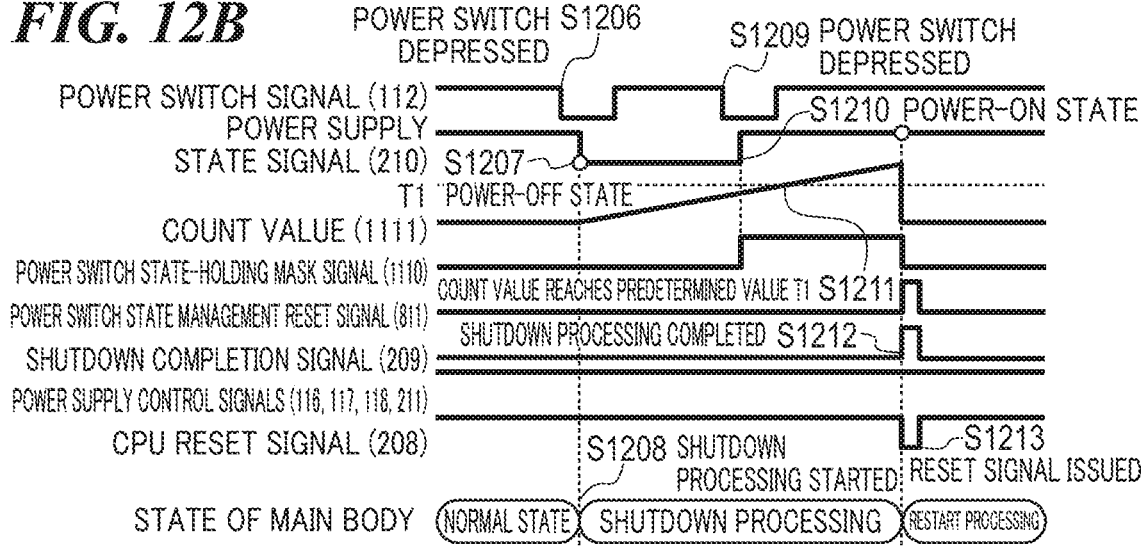
Figure 12C:
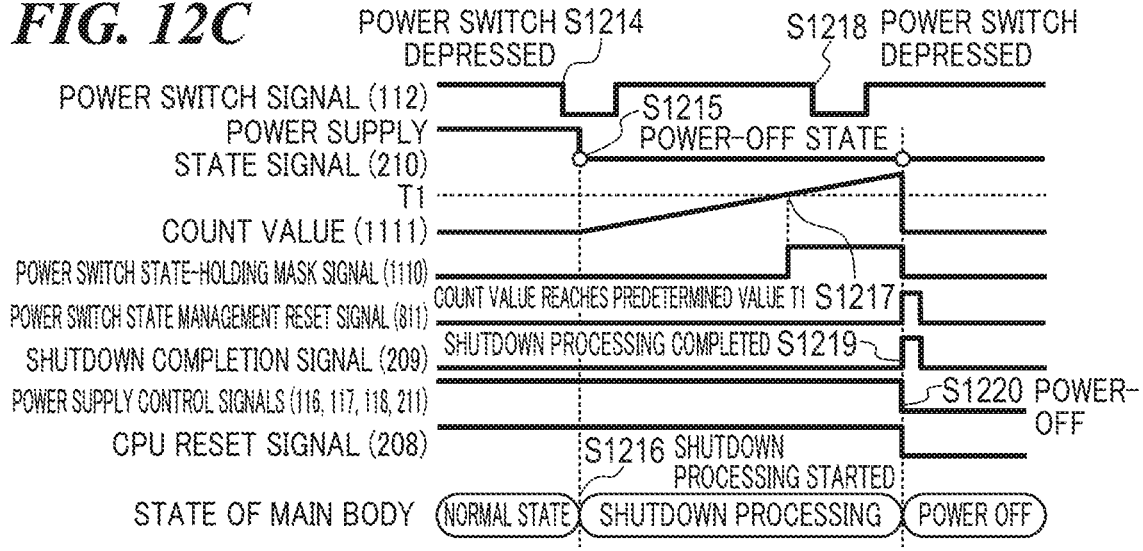

FIGS. 12A to 12C are timing diagrams of power supply control according to the third embodiment, which is performed by the power supply controller 200 shown in FIG. 11.

FIG. 12A is a power supply control timing diagram in a case where the push switch 106a of the power switch section 106 is depressed only once in the present embodiment.

When the push switch 106a of the power switch section 106 is depressed (step S1200), the power switch state-holding section 1100 changes the power supply state signal 210 into the power-off state (step S1201). When the power supply state signal 210 is changed into the power-off state, the CPU 201 starts shutdown processing of the image forming apparatus 10 (step S1202). Further, the timer 1103 starts counting. After that, when the count value 1111 reaches a predetermined value T1 (step S1203), the power switch state management section 1102 sets the power switch state-holding mask signal 1110 to high level. When the shutdown processing of the image forming apparatus 10 is completed, the CPU 201 sends the shutdown completion notification to the power state management section 1101 via the shutdown completion signal 209 (step S1204). Upon receipt of the shutdown completion notification, the power state management section 1101 issues the power switch state management reset signal 811 to the power switch state management section 1102 and the timer 1103. Upon receipt of the power switch state management reset signal 811, the power switch state management section 1102 sets the power switch state-holding mask signal 1110 to low level. Further, upon receipt of the power switch state management reset signal 811, the timer 1103 resets the count value 1111 to '0' (initial value). Further, the power state management section 1101 checks the power supply state signal 210. Since the power supply state signal 210 is in the power-off state in FIG. 12A, the power state management section 1101 switches the state of each of the power supply control signals 116, 117, 118, and 211 to the power-off state, and stops power supply to the components of the image forming apparatus 10 (step S1205).

FIG. 12B is a power supply control timing diagram in a case where the push switch 106a of the power switch section 106 is depressed twice within a predetermined time period in the present embodiment.

When the push switch 106a of the power switch section 106 is depressed (step S1206), the power switch state-holding section 1100 changes the power supply state signal 210 into the power-off state (step S1207). When the power supply state signal 210 is changed into the power-off state, the CPU 201 starts shutdown processing of the image forming apparatus 10 (step S1208). Further, the timer 1103 starts counting. After that, in FIG. 12B, the push switch 106a of the power switch section 106 is depressed again before the count value 1111 reaches the predetermined value T1 (step S1211), i.e. in a state in which the count value 1111 is smaller than the predetermined value T1 (step S1209). In this case, the power switch state-holding section 1100 changes the power supply state signal 210 into the power-on state (step S1210). When the power supply state signal 210 is changed into the power-on state, the power switch state management section 1102 sets the power switch state-holding mask signal 1110 to high level. When the shutdown processing of the image forming apparatus 10 is completed, the CPU 201 sends the shutdown completion notification to the power state management section 1101 via the shutdown completion signal 209 (step S1212). Upon receipt of the shutdown completion notification, the power state management section 1101 issues the power switch state management reset signal 811 to the power switch state management section 1102 and the timer 1103. Upon receipt of the power switch state management reset signal 811, the power switch state management section 1102 sets the power switch state-holding mask signal 1110 to low level. Further, upon receipt of the power switch state management reset signal 811, the timer 1103 resets the count value 1111 to '0' (initial value). Further, the power state management section 1101 checks the power supply state signal 210. Since the power supply state signal 210 is in the power-on state, the power state management section 1101 issues the CPU reset signal 208 to the CPU 201 (step S1213). Upon receipt of the CPU reset signal 208, the CPU 201 executes restart processing of the image forming apparatus 10.

FIG. 12C is a power supply control timing diagram in a case where the push switch 106a of the power switch section 106 is depressed for the second time after the predetermined time period elapses in the present embodiment.

When the push switch 106a of the power switch section 106 is depressed (step S1214), the power switch state-holding section 1100 changes the power supply state signal 210 into the power-off state (step S1215). When the power supply state signal 210 is changed into the power-off state, the CPU 201 starts shutdown processing of the image forming apparatus 10 (step S1216). Further, the timer 1103 starts counting. After that, when the count value 1111 reaches the predetermined value T1 (step S1217), the power switch state management section 1102 sets the power switch state-holding mask signal 1110 to high level.

After that, in FIG. 12C, the push switch 106a of the power switch section 106 is depressed again after the predetermined time period (corresponding to the predetermined value T1) has elapsed (step S1218). However, since the power switch state-holding mask signal 1110 is at high level, even when the push switch 106a of the power switch section 106 is depressed as mentioned above, the power switch state-holding section 1100 holds the power supply state signal 210 in the power-off state without changing the state of the power supply state signal 210. When the shutdown processing of the image forming apparatus 10 is completed, the CPU 201 sends the shutdown completion notification to the power state management section 1101 via the shutdown completion signal 209 (step S1219). Upon receipt of the shutdown completion notification, the power state management section 1101 issues the power switch state management reset signal 811 to the power switch state management section 1102 and the timer 1103. Upon receipt of the power switch state management reset signal 811, the power switch state management section 1102 sets the power switch state-holding mask signal 1110 to low level. Further, upon receipt of the power switch state management reset signal 811, the timer 1103 resets the count value 1111 to '0' (initial value). Further, the power state management section 1101 checks the power supply state signal 210. Since the power supply state signal 210 is in the power-off state, the power state management section 1101 sets the state of each of the power supply control signals 116, 117, 118, and 211 to the power-off state, and stops power supply to the components of the image forming apparatus 10 (step S1220).

Note that there is a case where the push switch 106a of the power switch section 106 is depressed four times or more before the predetermined time period (T1) elapses after depression of the push switch 106a of the power switch section 106 for the first time. In the present embodiment, also in this case, the image forming apparatus 10 is restarted after completion of shutdown processing, similarly to the respective cases where the push switch 106a of the power switch section 106 is depressed twice and three times in the second embodiment.

Further, the present embodiment differs from the second embodiment in that the image forming apparatus 10 is restarted after completion of shutdown processing only in a case where depression of the push switch 106a of the power switch section 106 for the second time is performed before the predetermined time period elapses.

Figure 13:
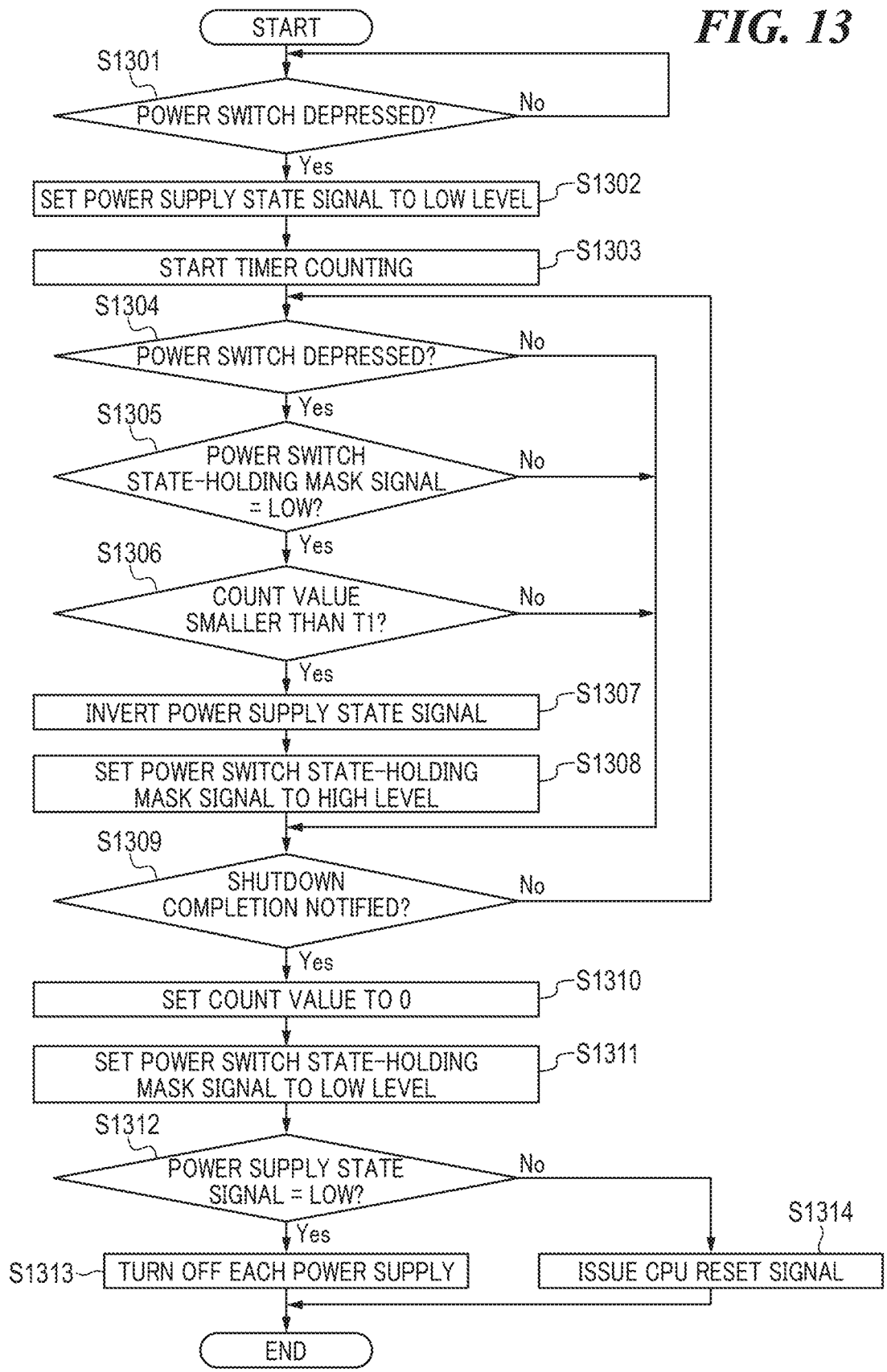
FIG. 13 is a flowchart of a power supply control process according to the third embodiment, which is performed by the power supply controller shown in FIG. 11.

FIG. 13 is a flowchart of a power supply control process according to the third embodiment, which is performed by the power supply controller 200 shown in FIG. 11. The present process is started when the image forming apparatus 10 enters the normal state.

First, in a step S1301, the power switch state-holding section 1100 determines whether or not the push switch 106a of the power switch section 106 has been depressed. If it is determined that the push switch 106a of the power switch section 106 has not been depressed (No to the step S1301), the power switch state-holding section 1100 waits until the push switch 106a of the power switch section 106 is depressed. If it is determined that the push switch 106a of the power switch section 106 has been depressed (Yes to the step S1301), the power switch state-holding section 1100 sets the power supply state signal 210 to low level (power-off state) (step S1302). Further, the timer 1103 starts counting (step S1303). Then, in a step S1304, the power switch state-holding section 1100 determines again whether or not the push switch 106a of the power switch section 106 has been depressed. If it is determined that the push switch 106a of the power switch section 106 has not been depressed (No to the step S1304), the process proceeds to a step S1309 without changing the state of the power supply state signal 210. If it is determined that the push switch 106a of the power switch section 106 has been depressed (Yes to the step S1304), the process proceeds to a step S1305. In the step S1305, it is determined whether or not the power switch state-holding mask signal 1110 is at low level in the power switch state-holding section 1100. If it is determined that the power switch state-holding mask signal 1110 is not at low level (No to the step S1305), the process proceeds to the step S1309. If it is determined that the power switch state-holding mask signal 1110 is at low level (Yes to the step S1305), the process proceeds to a step S1306.

In the step S1306, it is determined whether or not the count value 1111 is smaller than the predetermined value T1 in the power switch state management section 1102. If it is determined that the count value 1111 is not smaller than the predetermined value T1 (No to the step S1306), the process proceeds to the step S1309. If it is determined that the count value 1111 is smaller than the predetermined value T1 (Yes to the step S1306), the power switch state-holding section 1100 inverts the power supply state signal 210 (step S1307). Further, the power switch state management section 1102 sets the power switch state-holding mask signal 1110 to high level (step S1308). Then, the process proceeds to the step S1309.

In the step S1309, the power state management section 1101 determines via the shutdown completion signal 209 whether or not the shutdown completion notification has been received. If no shutdown completion notification has been received (No to the step S1309), the process returns to the step S1304, and the power switch state-holding section 1100 determines again whether or not the push switch 106a of the power switch section 106 has been depressed. If the shutdown completion notification has been received (Yes to the step S1309), the timer 1103 sets the count value 1111 to '0' (step S1310). Further, the power switch state management section 1102 sets the power switch state-holding mask signal 1110 to low level (step S1311). Then, the process proceeds to a step S1312.

In the step S1312, it is determined whether or not the power supply state signal 210 is at low level (in the power-off state), in the power state management section 1101. If it is determined that the power supply state signal 210 is at low level (in the power-off state) (Yes to the step S1312), the power state management section 1101 switches the state of each of the power supply control signals 116, 117, 118, and 211 to the power-off state. With this, the power state management section 1101 stops power supply to the components of the image forming apparatus 10 (step S1313), followed by terminating the present process. On the other hand, if it is determined that the power supply state signal 210 is at high level (in the power-on state) (No to the step S1312), the power state management section 1101 issues the CPU reset signal 208 (step S1314), followed by terminating the present process.

The operation of the CPU 201 is the same as the shutdown process according to the first embodiment, shown in FIG. 6. Further, the display on the display unit concerning whether the image forming apparatus 10 is to be restarted or power supply thereto is to be stopped after completion of shutdown processing is the same as in the first embodiment.

As described above, according to the present embodiment, it is possible to give a restart instruction without waiting until the power of the main body of the image forming apparatus 10 provided with the power switch section 106, which is the push switch, is completely turned off. This eliminates the user's waiting time and makes it possible to improve the usability.

Next, a description will be given of the fourth embodiment of the present invention. The present embodiment is the same as the first to third embodiments in the basic operations in which the state of the power supply state signal 210 is checked when shutdown processing of the image forming apparatus 10 is completed and whether or not to restart the image forming apparatus 10 is determined according to the checked state.

In the present embodiment, in a case where an operation for pressing the push switch 106a of the power switch section 106 for turning off the image forming apparatus 10 is continued for a predetermined time period, the image forming apparatus 10 is restarted.

Figure 14:
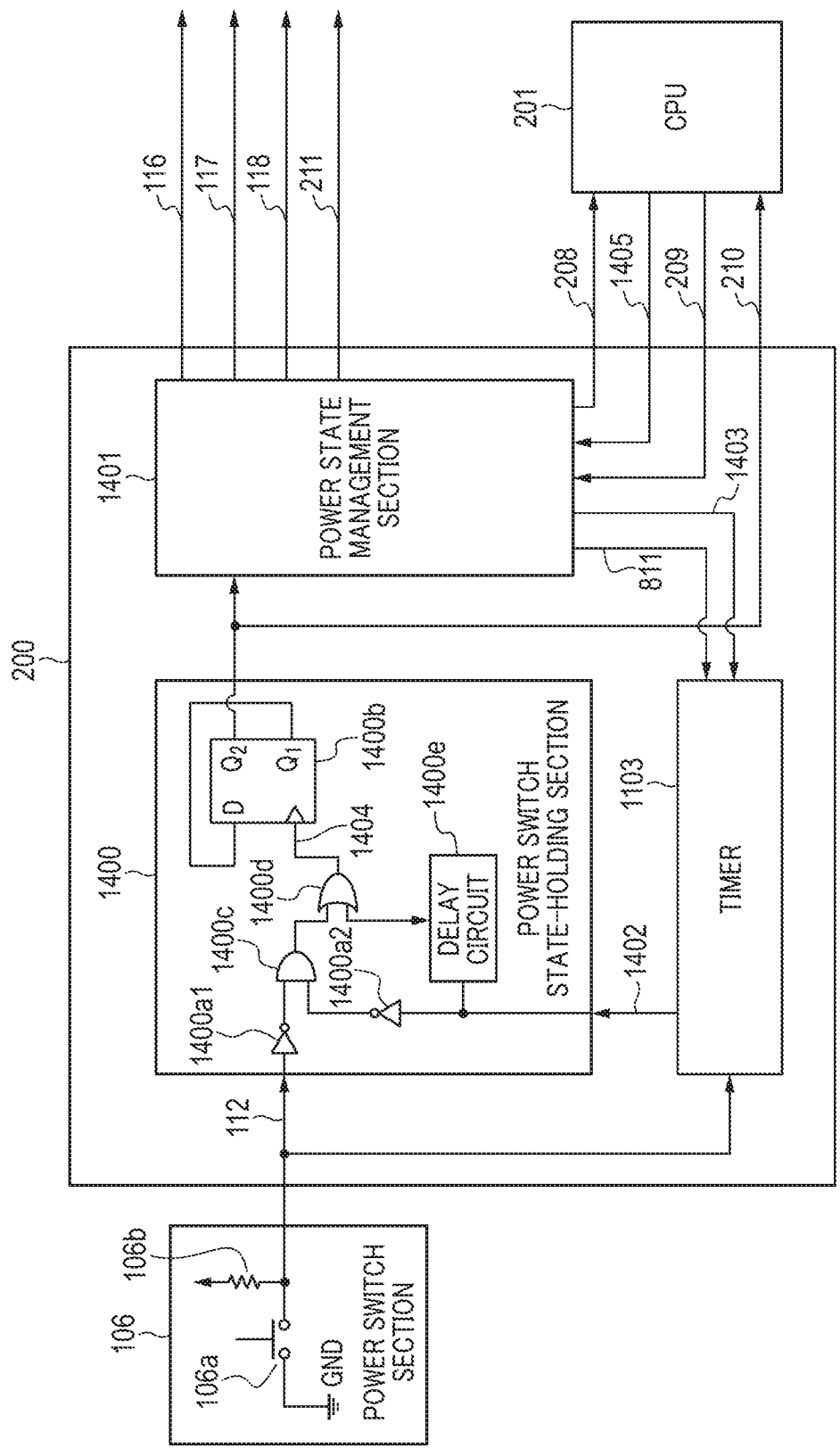
FIG. 14 is a block diagram showing the internal configuration of a power supply controller, appearing in FIG. 1, according to a fourth embodiment.

FIG. 14 is a block diagram showing the internal configuration of the power supply controller 200 according to the fourth embodiment. The power supply controller 200 in the present embodiment differs from that in the third embodiment in the following points: First, the power supply controller 200 includes a power switch state-holding section 1400 in place of the power switch state-holding section 1100 and a power state management section 1401 in place of the power state management section 1101. Further, the power supply controller 200 does not include the power switch state management section 1102.

The power switch signal 112 is input to the power switch state holding section 1400 from the power switch section 106.

The power switch state-holding section 1400 is comprised of a D flip-flop 1400b, inverters 1400a1 and 1400a2, an AND logic 1400c, an OR logic 1400d, and a delay circuit 1400e. The power switch signal 112 output from the power switch section 106 is logically inverted by the inverter 1400a1 and is input to the AND logic 1400c. In addition, a power supply state-on signal 1402 output from the timer 1103 is inverted by the inverter 1400a2 and is input to the AND logic 1400c. An output from the AND logic 1400c is input to the OR logic 1400d. The power supply state-on signal 1402 output from the timer 1103 is input to the delay circuit 1400c and an output signal from the delay circuit 1400e is input to the OR logic 1400d. The delay circuit 1400e has a function of delaying the timing of the power supply state-on signal 1402. An OR logic output signal 1404 from the OR logic 1400d is input to a clock input terminal of the D flip-flop 1400b. Further, an output form an output terminal $Q_1$ of the D flip-flop 1400b is input to an input terminal D of the D-flip flop 1400*b*, and an output from an output terminal Q₂ of the D-flip flop 1400*b* is output to the power state management section 1401 and the CPU 201 as the power supply state signal 210. With this, when an operation of pressing the push switch 106*a* of the power switch section 106 is detected, or the state of the power supply state-on signal 1402 is set to high level, the power switch state-holding section 1400 logically inverts the output from the D flip-flop 1400*b* and holds the logically inverted output from the D flip-flop 1400*b*. Then, the power switch state-holding section 1400 notifies the power state management section 1401 and the CPU 201 of the logically inverted output from the D flip-flop 1400*b* as the power supply state signal 210.

The power supply state signal 210 is input to the power state management section 1401 from the power switch state-holding section 1400. In addition, the power state management section 1401 outputs the CPU reset signal 208 to the CPU 201, and the CPU 201 inputs the shutdown completion signal 209 and a communication signal 1405 to the power state management section 1401. Further, the power state management section 1401 outputs the power switch state management reset signal 811 and a count enable signal 1403 to the timer 1103. The CPU reset signal 208 is a signal for resetting the CPU 201. The shutdown completion signal 209 is a signal for notifying the power state management section 1401 that the CPU 201 has completed shutdown processing. The communication signal 1405 is a signal input from the CPU 201 to the power state management section 1401 to set an enabled state of the count enable signal 1403 output to the timer 1103. The power switch state management reset signal 811 is a signal for initializing the count value of the timer 1103. The count enable signal 1403 is a signal for controlling the operation of the timer 1103. In a case where the count enable signal 1403 is at high level, the timer function of the timer 1103 is enabled, and the timer 1103 performs counting (counting up of an internal counter thereof) during a time period in which the power switch signal 112 is at low level. In a case where the count enable signal 1403 is at low level, the timer function of the timer 1103 is disabled, and the timer 1103 does not perform counting. The count enable signal 1403 is set to high level by the CPU 201 via the communication signal 1405. The count enable signal 1403 is set to low level when the power supply state signal 210 is at low level and also the shutdown completion signal 209 is at high level.

Upon receipt of the shutdown completion notification via the shutdown completion signal 209, the power state management section 1401 checks the state of the power supply state signal 210. As a result of the check of the power supply state signal 210, if the power switch state is in the on-state, the power state management section 1401 issues the CPU reset signal 208 to the CPU 201. On the other hand, as a result of the check of the power supply state signal 210, if the power switch state is in the off-state, the power state management section 1401 switches the state of each of the power supply control signals 116, 117, 118, and 211 to the power-off state and stops power supply to the components of the image forming apparatus 10.

Upon detection of the power-off state of the power supply state signal 210, the CPU 201 starts shutdown processing of the image forming apparatus 10. When the shutdown processing is completed, the CPU 201 notifies the power state management section 1401 of completion of the shutdown processing via the shutdown completion signal 209. Further, upon receipt of the CPU reset signal 208, the CPU 201 executes restart processing of the image forming apparatus 10. Further, the CPU 201 inputs the communication signal 1405 to the power state management section 1401 to set an enabled state of the count enable signal 1403.

The timer 1103 has a function of measuring time. The power switch signal 112 is input to the timer 1103 from the power switch section 106. In addition, the count enable signal 1403 and the power switch state management reset signal 811 are input to the timer 1103 from the power state management section 1401. Further, the timer 1103 outputs the power supply state-on signal 1402 to the power switch state-holding section 1400. The timer 1103 counts up by the internal counter thereof in a case where the count enable signal 1403 is at high level and also the power switch signal 112 is at low level. Then, when the counter value reaches the predetermined value T1 (corresponding to the predetermined time period), the timer 1103 sets the power supply state-on signal 1402 to high level. When the power switch signal 112 is set to high level, the counter value of the timer 1103 is reset to 0 (initial value). Further, in a case where the counter value is equal to the predetermined value T1, when the power switch state management reset signal 811 is set to high level, the counter value is reset to 0 (initial value).

Figure 15A:
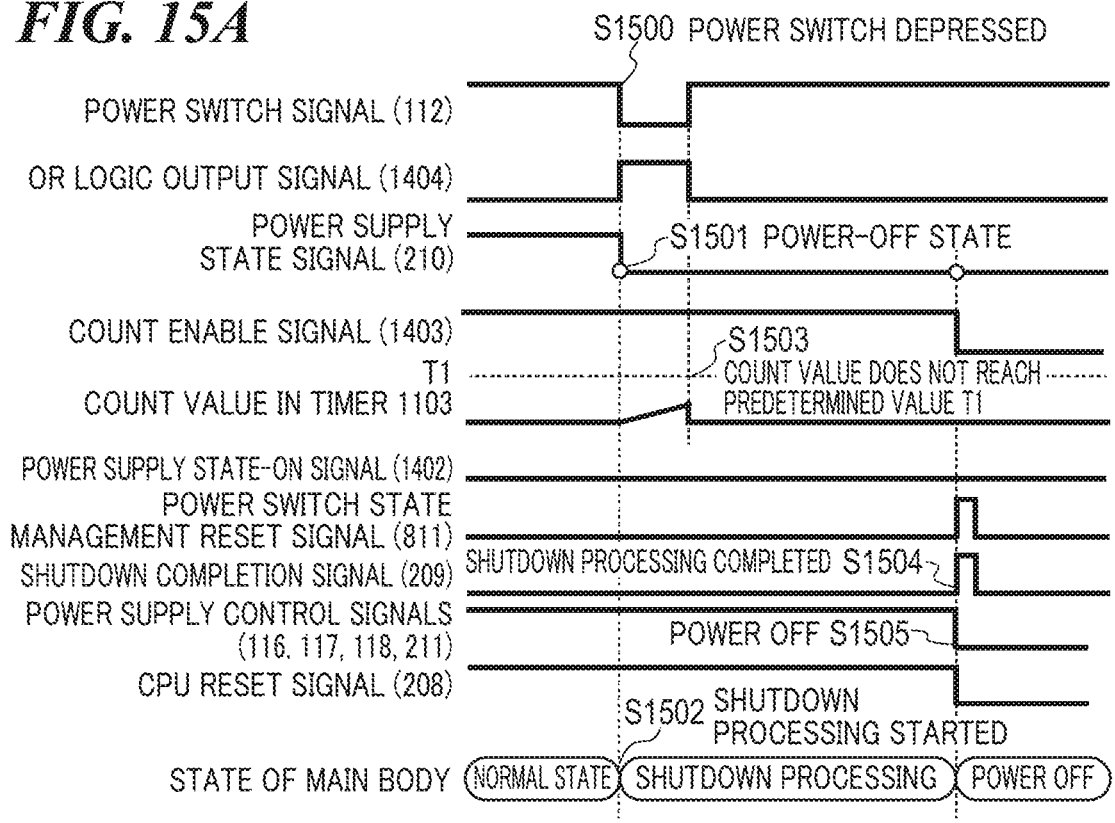
FIGS. 15A and 15B are timing diagrams of power supply control according to the fourth embodiment, which is performed by the power supply controller shown in FIG. 14.
Figure 15B:
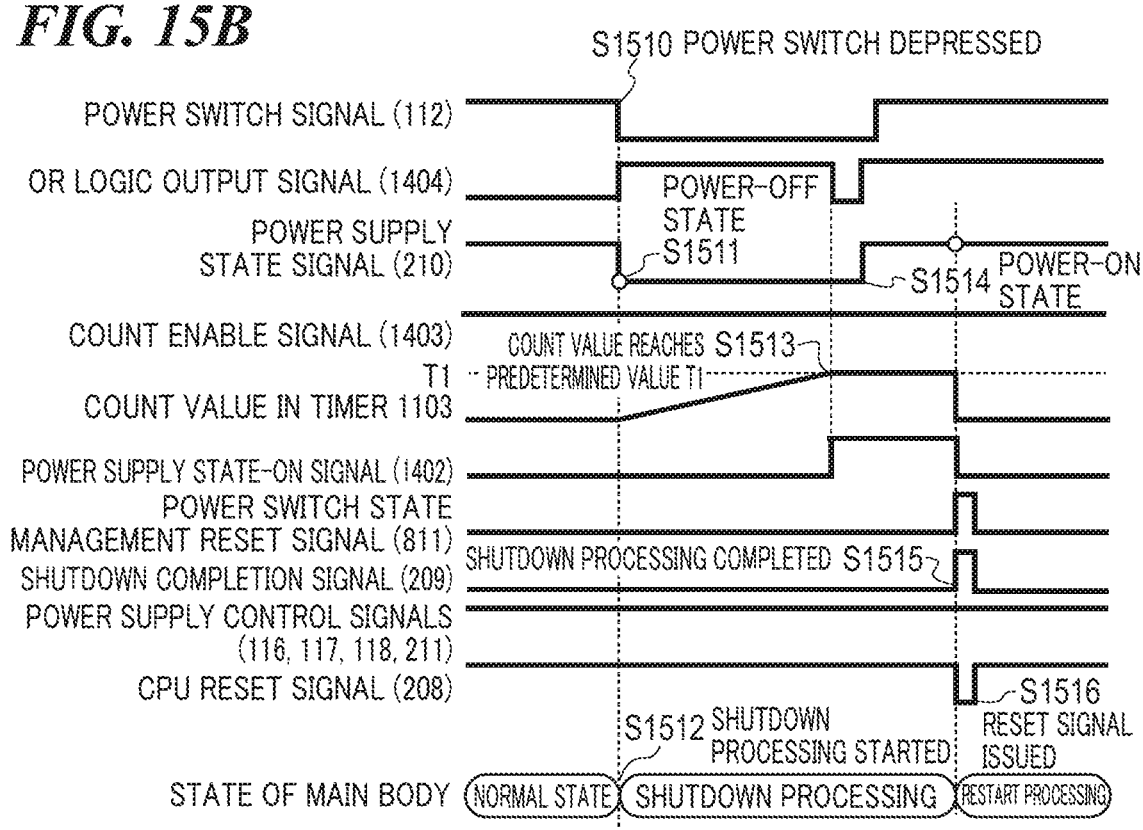

FIGS. 15A and 15B are timing diagrams of power supply control according to the fourth embodiment, which is performed by the power supply controller 200 shown in FIG. 14. Note that it is assumed that at the start of these timing diagrams, the CPU 201 has already input the communication signal 1405 to the power state management section 1401 to set an enabled state of the count enable signal 1403.

FIG. 15A is a power supply control timing diagram in a case where depression duration of the push switch 106*a* of the power switch section 106 is less than the predetermined time period (corresponding to the predetermined value T1) in the fourth embodiment.

When the push switch 106*a* of the power switch section 106 is depressed (step S1500), the power switch state-holding section 1400 changes the power supply state signal 210 into the power-off state because the state of the OR logic output signal 1404 becomes high level (step S1501). When the power supply state signal 210 is changed into the power-off state, the CPU 201 starts shutdown processing of the image forming apparatus 10 (step S1502), and further, the timer 1103 starts counting. After that, in a case where the push switch 106*a* of the switch section 106 is released from the depressed state before the count value reaches the predetermined value T1, as shown in FIG. 15A, the count value of the timer 1103 is reset to 0 (step S1503). When the shutdown processing of the image forming apparatus 10 is completed, the CPU 201 notifies the power state management section 1401 of completion of the shutdown processing via the shutdown completion signal 209 (step S1504). Upon receipt of the shutdown completion notification, the power state management section 1401 issues the power switch state management reset signal 811 to the timer 1103. Further, the power state management section 1401 checks the power supply state signal 210. Since the power supply state signal 210 is in the power-off state, the power state management section 1401 switches the state of each of the power supply control signals 116, 117, 118, and 211 to the power-off state, and stops power supply to the components of the image forming apparatus 10 (step 1505).

FIG. 15B is a power supply control timing diagram in a case where depression duration of the push switch 106*a* of the power switch section 106 is not less than the predetermined time period (corresponding to the predetermined value T1) in the fourth embodiment.

When the push switch 106a of the power switch section 106 is depressed (step S1510), the power switch state-holding section 1400 changes the power supply state signal 210 into the power-off state because the state of the OR logic output signal 1404 becomes high level (step S1511). When the power supply state signal 210 is changed into the power-off state, the CPU 201 starts shutdown processing of the image forming apparatus 10 (step S1512), and further, the timer 1103 starts counting. After that, in FIG. 15B (step S1513), the push switch 106a of the power switch section 106 continues to be depressed for the predetermined time period or longer, whereby the count value of the timer 1103 reaches the predetermined value T1. In this case, the timer 1103 stops counting and sets the power supply state-on signal 1402 to high level. Since the power supply state-on signal 1402 is set to high level, the OR logic output signal 1404 in the power switch state-holding section 1400 once becomes low level and then becomes high level, and hence the power supply state signal 210 is changed into the power-on state (step S1514). When the shutdown processing of the image forming apparatus 10 is completed, the CPU 201 notifies the power state management section 1401 of completion of the shutdown processing via the shutdown completion signal 209 (step S1515). Upon receipt of the shutdown completion notification, the power state management section 1401 issues the power switch state management reset signal 811 to the timer 1103. Upon receipt of the power switch state management reset signal 811, the timer 1103 resets the count value to 0 (initial value). Further, the power state management section 1401 checks the power supply state signal 210. Since the power supply state signal 210 is in the power-on state, the power state management section 1401 issues the CPU reset signal 208 to the CPU 201 (step 1516). Upon receipt of the CPU reset signal 208, the CPU 201 executes restart processing of the image forming apparatus 10.

Figure 16:
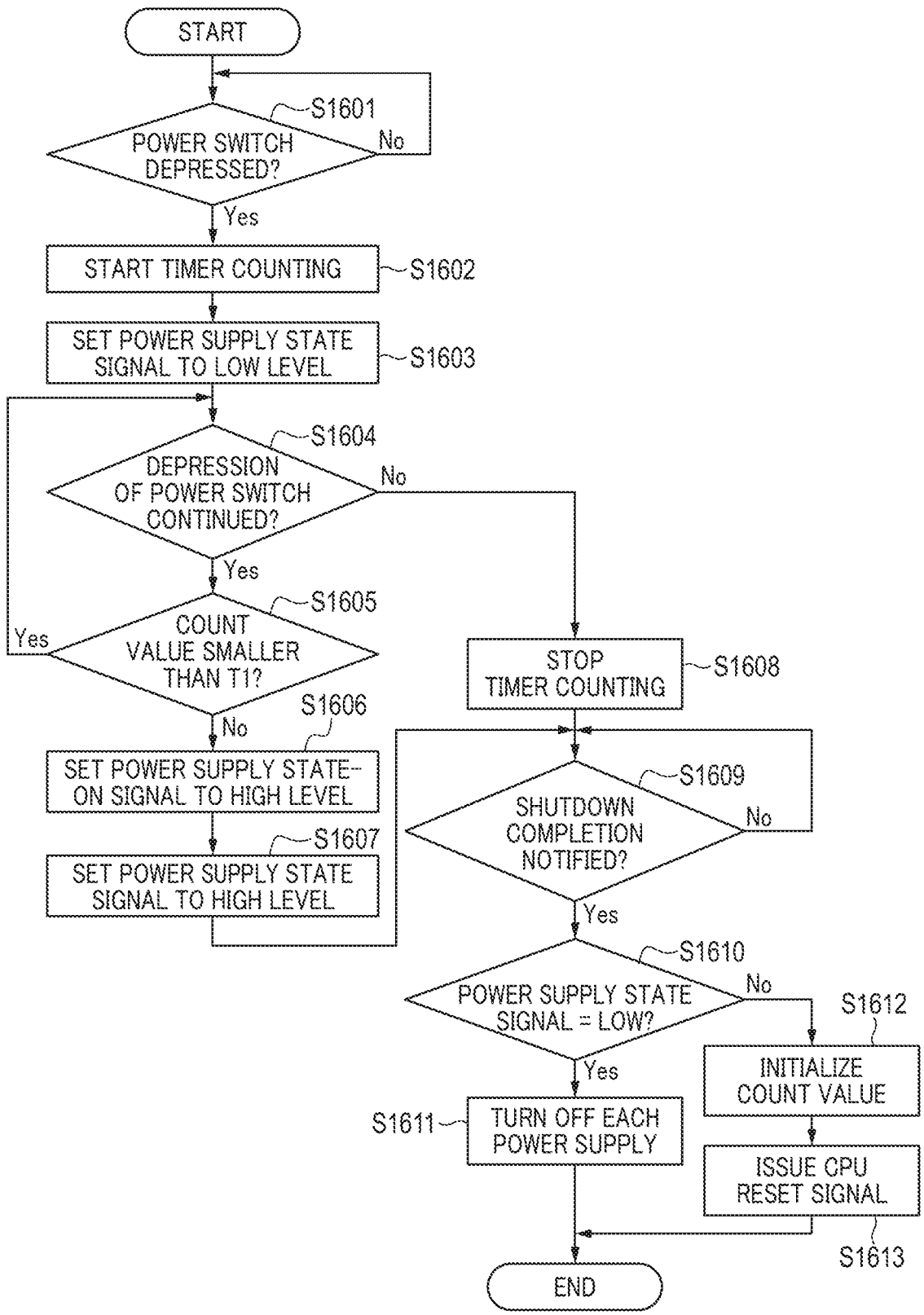
FIG. 16 is a flowchart of a power supply control process according to the fourth embodiment, which is performed by the power supply controller shown in FIG. 14.

FIG. 16 is a flowchart of a power supply control process according to the fourth embodiment, which is performed by the power supply controller 200 shown in FIG. 14. The present process is started when the image forming apparatus 10 enters the normal state.

First, in a step S1601, the power switch state-holding section 1400 determines whether or not the push switch 106a of the power switch section 106 has been depressed. If it is determined that the push switch 106a of the power switch section 106 has not been depressed (No to the step S1601), the power switch state-holding section 1400 waits until the push switch 106a of the power switch section 106 is depressed. If it is determined that the push switch 106a of the power switch section 106 has been depressed (Yes to the step S1601), the timer 1103 starts counting by the internal counter thereof (step S1602). The power switch state-holding section 1400 sets the power supply state signal 210 to low level (power-off state) (step S1603). Then, in a step S1604, the power switch state-holding section 1400 determines whether or not the push switch 106a of the power switch section 106 continues to be depressed. If it is determined that the push switch 106a of the power switch section 106 has been released from the depressed state (No to the step S1604), the process proceeds to a step S1608 without changing the state of the power supply state signal 210. If it is determined that the push switch 106a of the power switch section 106 continues to be depressed (Yes to the step S1604), the process proceeds to a step S1605. In the step S1605, it is determined whether or not the count value is smaller than the predetermined value T1, in the power switch state-holding section 1400. If it is determined that the count value is smaller than the predetermined value T1 (Yes to the step S1605), the process returns to the step S1604. If it is determined that the count value is not smaller than the predetermined value T1 (No to the step S1605), the process proceeds to a step S1606, wherein the timer 1103 sets the power supply state-on signal 1402 to high level. In addition, the power switch state-holding section 1400 sets the power supply state signal 210 to high level (power-on state) (step S1607) and then the process proceeds to a step S1609. In the step S1608, the timer 1103 stops counting and the process proceeds to the step S1609.

In the step S1609, the power state management section 1401 determines via the shutdown completion signal 209 whether or not the shutdown completion notification has been received. If no shutdown completion notification has been received (No to the step S1609), the power state management section 1401 waits for the shutdown completion notification. If the shutdown completion notification has been received (Yes to the step S1609), it is determined whether or not the power supply state signal 210 is at low level, in the power state management section 1401 (step S1610). If it is determined that the power supply state signal 210 is at low level (Yes to the step S1610), the power state management section 1401 switches the state of each of the power supply control signals 116, 117, 118, and 211 to the power-off state. With this, the power state management section 1401 stops power supply to the components of the image forming apparatus 10 (step S1611), followed by terminating the present process. On the other hand, if it is not determined by the power state management section 1401 that the power supply state signal 210 is at low level (No to the step S1610), the process proceeds to a step S1612. In the step S1612, the timer 1103 resets the count value to 0 (initial value). Then, the power state management section 1401 issues the CPU reset signal 208 (step S1613), followed by terminating the present process.

As described above, according to the present embodiment, it is possible to give a restart instruction without waiting until the power of the main body of the image forming apparatus 10 provided with the power switch section 106, which is the push switch, is completely turned off. This eliminates the user's waiting time and makes it possible to improve the usability. Further, since power-off and restart are switched by depressing the push switch 106a of the power switch section 106 for the predetermined time period, it is possible to prevent the image forming apparatus 10 from being restarted by a user unintentionally depressing the push switch 106a of the power switch section 106.

Next, a description will be given of a fifth embodiment of the present invention. The present embodiment is the same as the first to fourth embodiments in the basic operations in which the state of the power supply state signal 210 is checked when shutdown processing of the image forming apparatus 10 is completed and whether or not to restart the image forming apparatus 10 is determined according to the checked state.

In the present embodiment, in a case where the push switch 106a of the power switch section 106 is once depressed to turn off the image forming apparatus 10 and then depressed again, the restart of the image forming apparatus 10 and the stop of power supply thereto are switched therebetween according to duration of the second depression of the push switch 106a of the power switch section 106.

Figure 17:
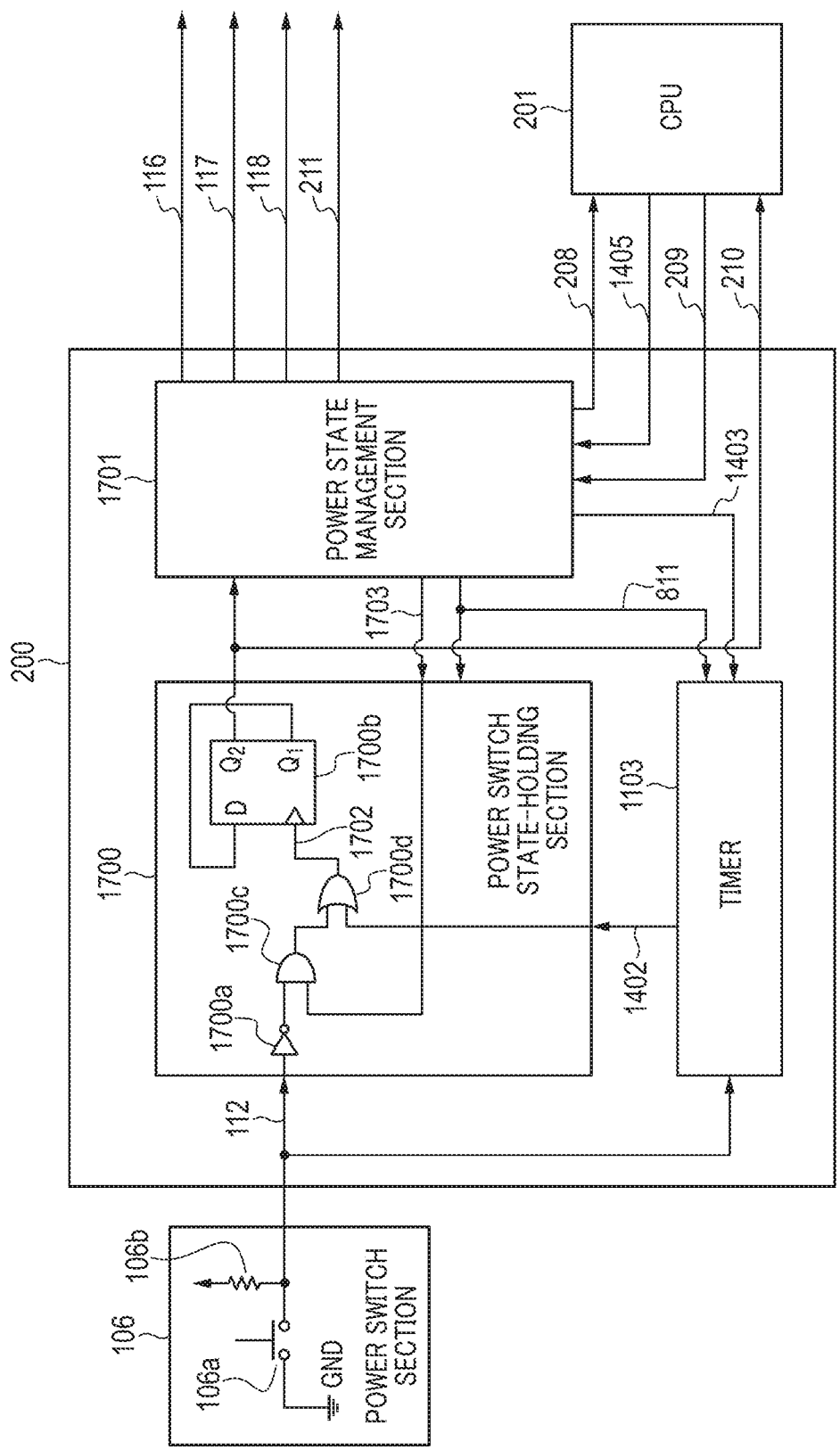
FIG. 17 is a block diagram showing the internal configuration of a power supply controller, appearing in FIG. 1, according to a fifth embodiment.

FIG. 17 is a block diagram showing the internal configuration of the power supply controller 200 according to the fifth embodiment. The power supply controller 200 in the fifth embodiment differs from that in the fourth embodiment in that the power supply controller 200 includes a power switch state-holding section 1700 in place of the power switch state-holding section 1400 and a power state management section 1701 in place of the power state management section 1401.

The power switch state-holding section 1700 is comprised of a D flip-flop 1700b, an inverter 1700a, an AND logic 1700c, and an OR logic 1700d. The power switch signal 112 output from the power switch section 106 is logically inverted by the inverter 1700a and is input to the AND logic 1700c. In addition, a power switch mask signal 1703 output from the power state management section 1701 is also input to the AND logic 1700c. An output from the AND logic 1700c is input to the OR logic 1700d. Further, the power supply state-on signal 1402 output from the timer 1103 is also input to the OR logic 1700d. An OR logic output signal 1702 from the OR logic 1700d is input to a clock input terminal of the D flip-flop 1700b. Further, an output from an output terminal $Q_1$ of the D flip-flop 1700b is input to an input terminal D of the D-flip flop 1700b and an output from an output terminal $Q_2$ of the D-flip flop 1700b is input to the power state management section 1701 and the CPU 201 as the power supply state signal 210.

The power switch state-holding section 1700 differs from that in the fourth embodiment in that the power switch mask signal 1703 is input from the power state management section 1701. The power switch mask signal 1703 is a signal for masking the power switch signal 112. In a case where the power switch mask signal 1703 is at high level, a change in the state of the power switch signal 112 is transmitted to the input of the D-flip flop 1700b. In a case where the power switch mask signal 1703 is at low level, a change in the state of the power switch signal 112 is not transmitted to the input of the D flip-flop 1700b.

The power switch mask signal 1703 added to the power state management section 1701 will be described. When power is supplied, the power state management section 1701 sets the power switch mask signal 1703 to high level. After power is supplied to the whole image forming apparatus 10, the power state management section 1701 changes the state of the power switch mask signal 1703 according to the state of the power supply state signal 210 output from the power switch state-holding section 1700. More specifically, in a case where the power supply state signal 210 is at high level, the power switch mask signal 1703 is at high level. In a case where the power supply state signal 210 is at low level, the power switch mask signal 1703 is at low level.

Figure 18A:
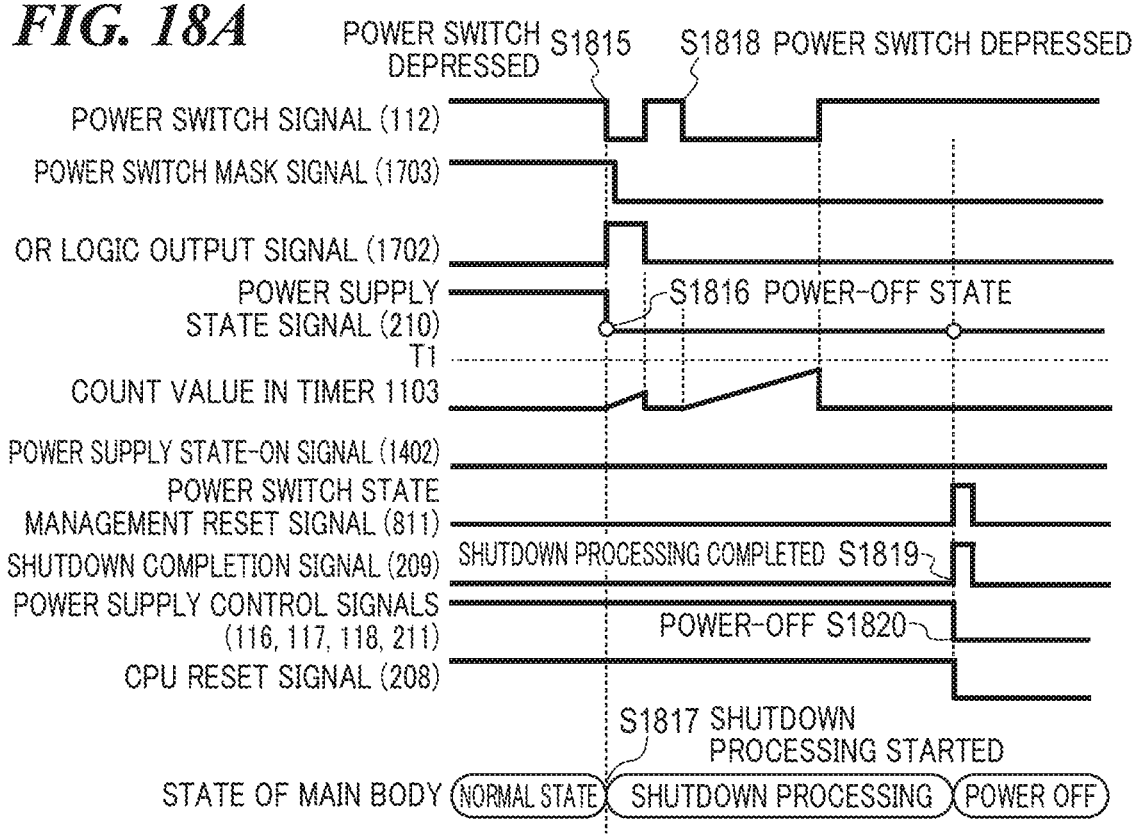
FIGS. 18A and 18B are timing diagrams of power supply control according to the fifth embodiment, which is performed by the power supply controller shown in FIG. 17.
Figure 18B:
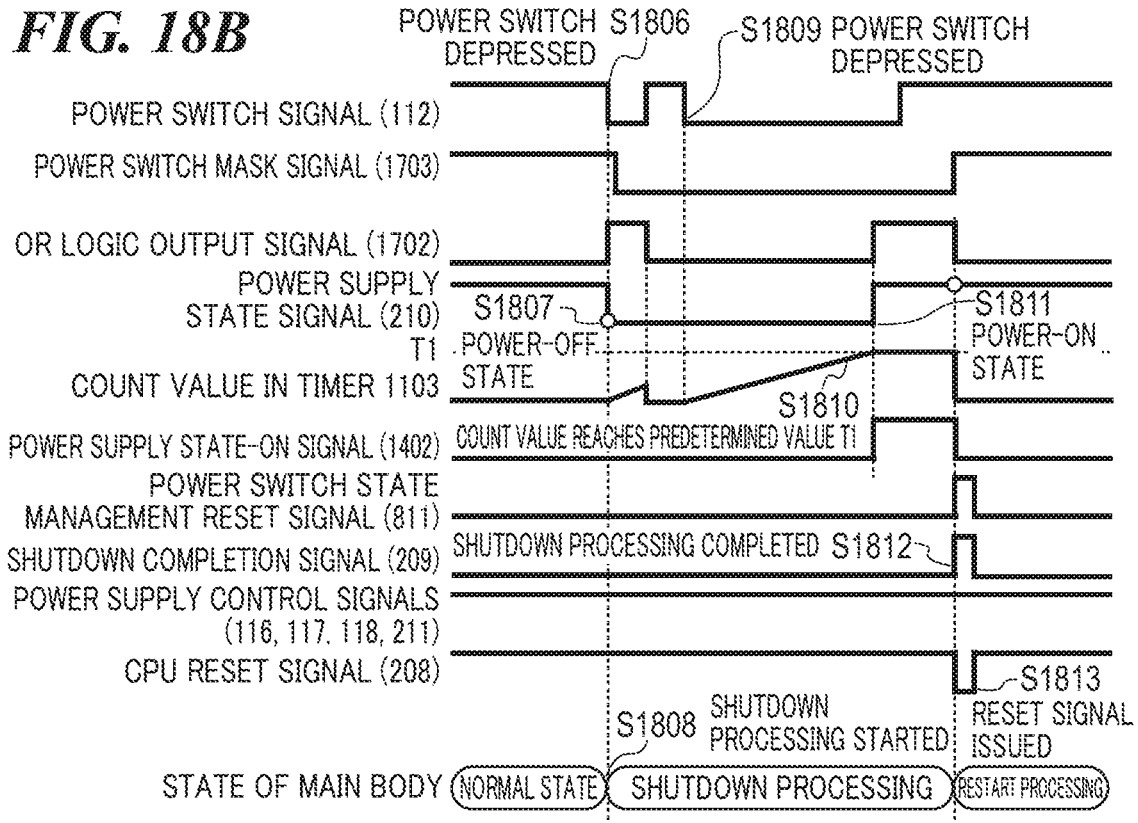

FIGS. 18A and 18B are timing diagrams of power supply control according to the fifth embodiment, which is performed by the power supply controller 200 shown in FIG. 17.

FIG. 18A is a power supply control timing diagram in a case where the push switch 106a of the power switch section 106 is depressed and then depressed again for a time period less than a predetermined time period in the fifth embodiment.

When the push switch 106a of the power switch section 106 is depressed (step S1815), the power switch state-holding section 1700 changes the power supply state signal 210 into the power-off state because the state of the OR logic output signal 1702 becomes high level (step S1816). At this time, the power state management section 1701 sets the power switch mask signal 1703 to low level. When the power supply state signal 210 is changed into the power-off state, the CPU 201 starts shutdown processing of the image forming apparatus 10 (step S1817). Further, the timer 1103 starts counting. After that, when the push switch 106a of the power switch section 106 is released from the depressed state before the count value reaches the predetermined value T1, as shown in FIG. 18A, the count value of the timer 1103 is reset to 0. When the push switch 106a of the power switch section 106 is depressed again (step S1818), the power switch state-holding section 1700 maintains the power-off state of the power supply state signal 210 because the state of the OR logic output signal 1702 is held at low level. Further, the timer 1103 starts counting again. After that, the push switch 106a of the power switch section 106 is released from the depressed state before the count value reaches the predetermined value T1, and hence the count value is reset to 0. When the shutdown processing of the image forming apparatus 10 is completed, the CPU 201 notifies the power state management section 1701 of completion of the shutdown processing via the shutdown completion signal 209 (step S1819). Upon receipt of the shutdown completion notification, the power state management section 1701 issues the power switch state management reset signal 811 to the timer 1103. Further, the power state management section 1701 checks the power supply state signal 210. Since the power supply state signal 210 is in the power-off state, the power state management section 1701 switches the state of each of the power supply control signals 116, 117, 118, and 211 to the power-off state, and stops power supply to the components of the image forming apparatus 10 (step S1820).

FIG. 18B is a power supply control timing diagram in a case where the push switch 106a of the power switch section 106 is depressed and then depressed again for a time period not less than the predetermined time period (corresponding to the predetermined value T1) in the fifth embodiment.

When the push switch 106a of the power switch section 106 is depressed (step S1806), the power switch state-holding section 1700 changes the power supply state signal 210 into the power-off state because the state of the OR logic output signal 1702 becomes high level (step S1807). When the power supply state signal 210 is changed into the power-off state, the CPU 201 starts shutdown processing of the image forming apparatus 10 (step S1808), and further, the timer 1103 starts counting. After that, when the push switch 106a of the power switch section 106 is released from the depressed state before the count value reaches T1, as shown in FIG. 18B, the count value counted inside the timer 1103 is reset to 0 and the OR logic output signal 1702 is set to low level. Further, when the push switch 106a of the power switch section 106 is depressed again (step S1809), the power switch state-holding section 1700 maintains the power-off state of the power supply state signal 210 because the OR logic output signal 1702 is held at low level, and further, the timer 1103 starts counting again. After that, the push switch 106a of the power switch section 106 is depressed for a time period not less than the predetermined time period (corresponding to the predetermined value T1) so that the count value reaches the predetermined value T1 in FIG. 18B (step S1810). In this case, the timer 1103 sets the power supply state-on signal 1402 to high level. Since the power supply state-on signal 1402 becomes high level, the OR logic output signal 1702 in the power switch state-holding section 1700 becomes high level, and hence the power supply state signal 210 is changed into the on-state (step S1811). When the shutdown processing of the image forming apparatus 10 is completed, the CPU 201 notifies the power state management section 1701 of completion of the shutdown processing via the shutdown completion signal 209 (step S1812). Upon receipt of the shutdown completion notification, the power state management section 1701 issues the power switch state management reset signal 811 to the timer 1103. Upon receipt of the power switch state management reset signal 811, the timer 1103 resets the count value to 0 (initial value). Further, the power state management section 1701 checks the power supply state signal 210. Since the power supply state signal 210 is in the power-on state, the power state management section 1701 issues the CPU reset signal 208 to the CPU 201 (step S1813). Upon receipt of the CPU reset signal 208, the CPU 201 executes restart processing of the image forming apparatus 10.

Figure 19:
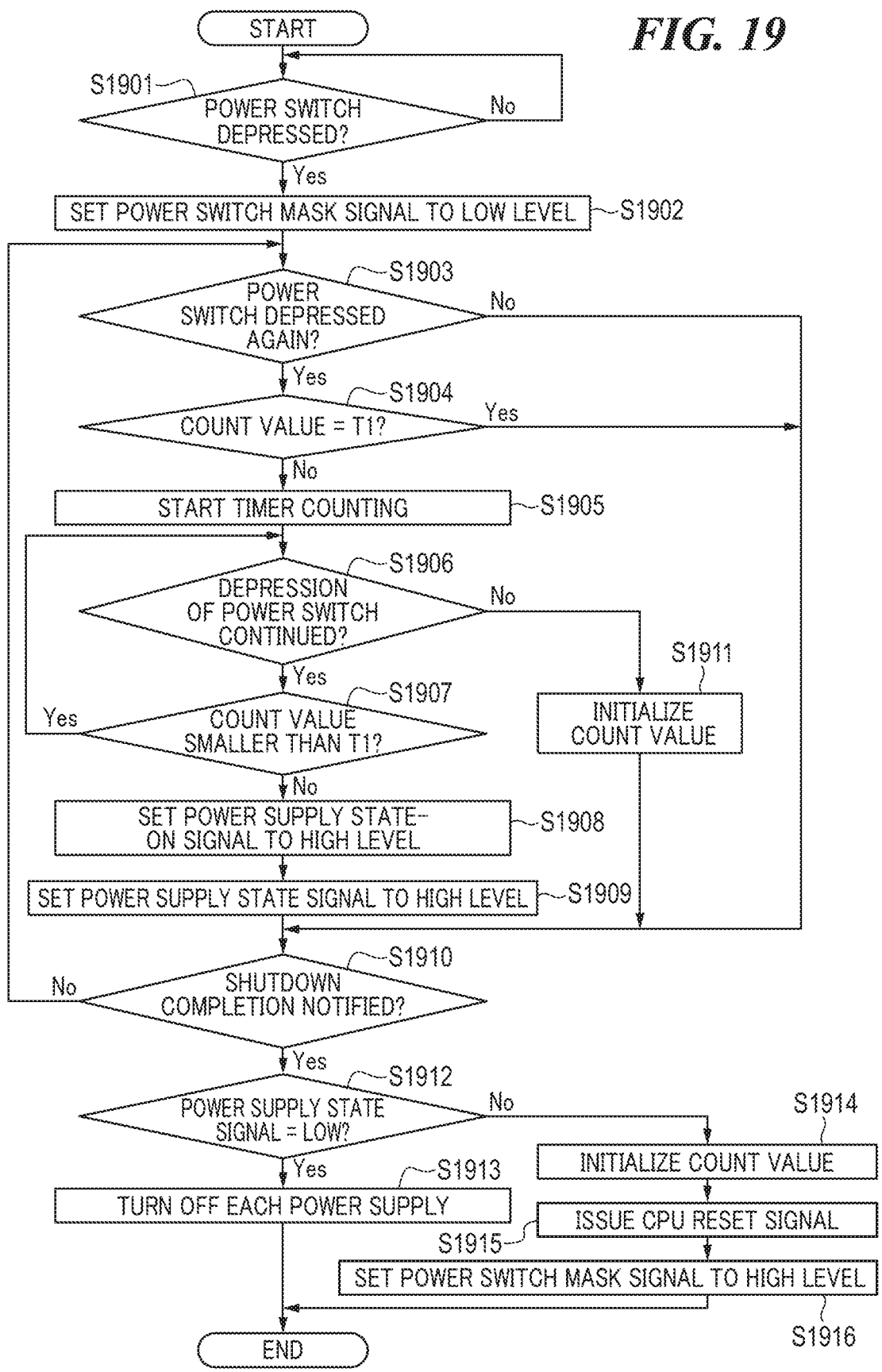
FIG. 19 is a flowchart of a power supply control process according to the fifth embodiment, which is performed by the power supply controller shown in FIG. 17.

FIG. 19 is a flowchart of a power supply control process according to the fifth embodiment, which is performed by the power supply controller 200 shown in FIG. 17. The present process is started when the image forming apparatus 10 enters the normal state.

First, in a step S1901, the power switch state-holding section 1700 determines whether or not the push switch 106a of the power switch section 106 has been depressed. If it is determined that the push switch 106a of the power switch section 106 has not been depressed (No to the step S1901), the power switch state-holding section 1700 waits until the push switch 106a of the power switch section 106 is depressed. If it is determined by the power switch state-holding section 1700 in the step S1901 that the push switch 106a of the power switch section 106 has been depressed, the process proceeds to a step S1902.

In the step S1902, the power state management section 1701 sets the power switch mask signal 1703 to low level.

In a step S1903, the power switch state-holding section 1700 determines again whether or not the push switch 106a of the power switch section 106 has been depressed. If it is determined by the power switch state-holding section 1700 in the step S1903 that the push switch 106a of the power switch section 106 has been depressed again, the process proceeds to a step S1904. If it is determined again by the power switch state-holding section 1700 in the step S1903 that the push switch 106a of the power switch section 106 has not been depressed, the process proceeds to a step S1910.

In the step S1904, it is determined whether or not the count value of the timer 1103 has reached the predetermined value T1. If it is determined in the step S1904 that the count value of the timer 1103 has reached the predetermined value T1, the process proceeds to the step S1910. If it is determined in the step S1904 that the count value of the timer 1103 has not reached the predetermined value T1, the process proceeds to a step S1905.

In the step S1905, the timer 1103 starts counting using the internal counter.

In a step S1906, the power switch state-holding section 1700 determines whether or not the push switch 106a of the power switch section 106 continues to be depressed. If it is determined by the power switch state-holding section 1700 in the step S1906 that the push switch 106a of the power switch section 106 is still being depressed, the process proceeds to a step S1907. If it is determined by the power switch state-holding section 1700 in the step S1906 that the push switch 106a of the power switch section 106 has been released from the depressed state, the process proceeds to a step S1911.

In the step S1907, it is determined whether or not the count value of the timer 1103 is smaller than the predetermined value T1. If it is determined in the step S1907 that the count value of the timer 1103 is smaller than the predetermined value T1, the process returns to the step S1906. If it is determined in the step S1907 that the count value of the timer 1103 is not smaller than T1, the process proceeds to a step S1908.

In the step S1908, the timer 1103 sets the power supply state-on signal 1402 to high level.

In a step S1909, the power switch state-holding section 1700 sets the power supply state signal 210 to high level.

In the step S1910, the power state management section 1701 determines via the shutdown completion signal 209 whether or not the shutdown completion notification has been received from the CPU 201. If it is determined in the step S1910 that the shutdown completion notification has been received, the process proceeds to a step S1912. If it is determined in the step S1910 that no shutdown completion notification has been received, the process returns to the step S1903.

In the step S1912, the power state management section 1701 determines whether or not the power supply state signal 210 is at low level. If it is determined by the power state management section 1701 in the step S1912 that the power supply state signal 210 is at low level, the process proceeds to a step S1913. If it is determined by the power state management section 1701 in the step S1912 that the power supply state signal 210 is not at low level, the process proceeds to a step S1914.

In the step S1913, the power state management section 1701 switches the state of each of the power supply control signals 116, 117, 118, and 211 to the power-off state, and stops power supply to the components of the image forming apparatus 10, followed by terminating the present process.

In the step S1911, the timer 1103 initializes its count value, and then, the process proceeds to the step S1910.

In the step S1914, the timer 1103 initializes its count value.

In a step S1915, the power state management section 1701 issues the CPU reset signal 208 to the CPU 201.

In a step S1916, the power state management section 1701 sets the power switch mask signal 1703 to high level, followed by terminating the present process.

As described above, according to the present embodiment, it is possible to give a restart instruction without waiting until the power of the main body of the image forming apparatus 10 provided with the power switch section 106, which is the push switch, is completely turned off. This eliminates the user's waiting time and makes it possible to improve the usability. Further, since the power-off and the restart are switched therebetween by depressing the push switch 106a of the power switch section 106 for the predetermined time period or longer, it is possible to prevent the image forming apparatus 10 from being restarted by a user unintentionally pressing the push switch 106a of the power switch section 106.

Next, a description will be given of a sixth embodiment of the present invention. The present embodiment is the same as the first to fifth embodiments in the basic operations in which the state of the power supply state signal 210 is checked when shutdown processing of the image forming apparatus 10 is completed and whether or not to restart the image forming apparatus 10 is determined according to the checked state.

In the present embodiment, in a case where a user depresses the service switch 306 of the console section 103 (third user's operation) and presses the push switch 106a of the power switch section 106 at the same time when the image forming apparatus 10 is in the normal state, it is determined that a restart instruction is given by the user. In this case, restart processing is performed after completion of shutdown processing. On the other hand, in a case where the user depresses the push switch 106a of the power switch section 106 without pressing the service switch 306 when the image forming apparatus 10 is in the normal state, power-off processing is performed after completion of shutdown processing.

Figure 20:
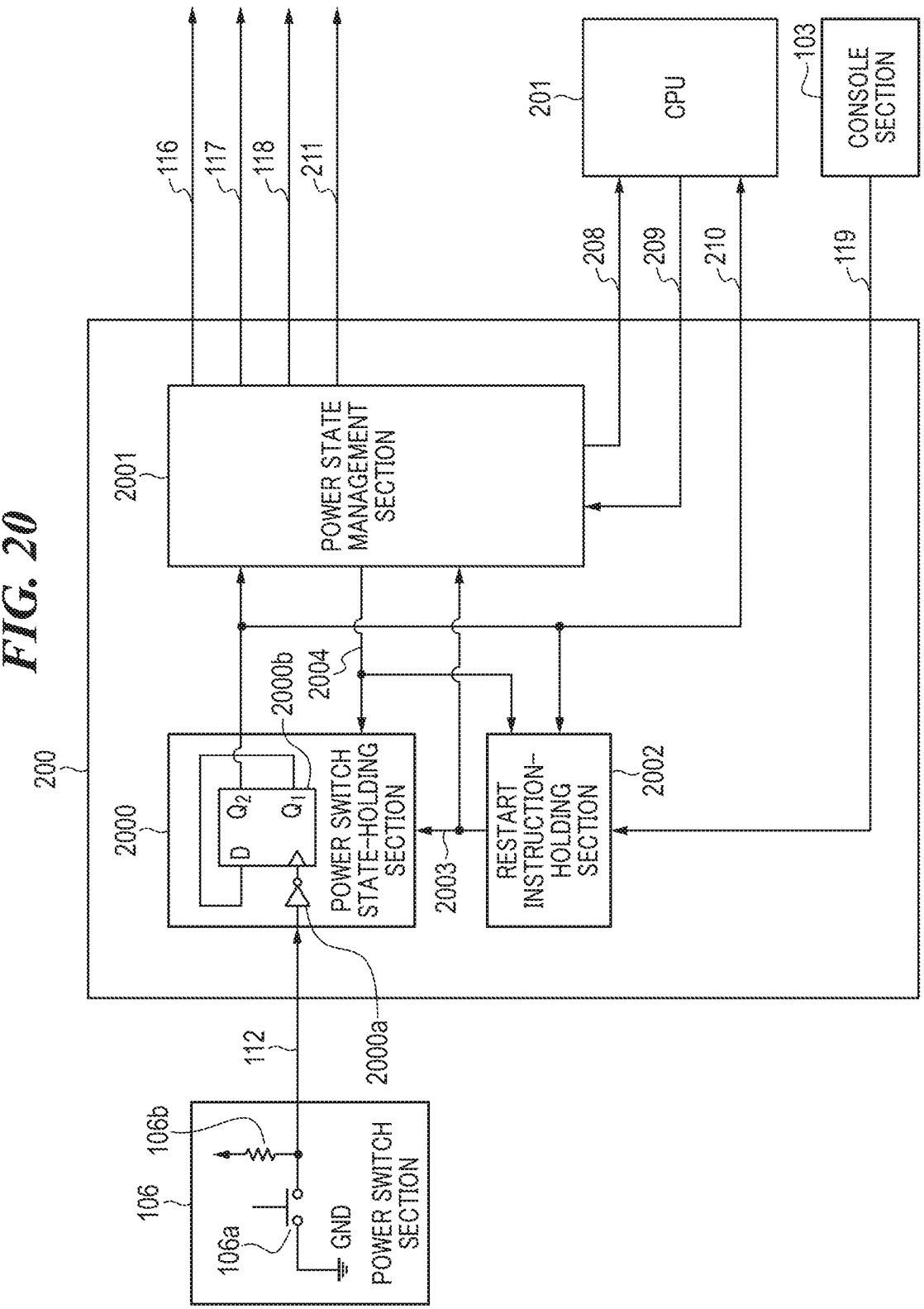
FIG. 20 is a block diagram showing the internal configuration of a power supply controller, appearing in FIG. 1, according to a sixth embodiment.

FIG. 20 is a block diagram showing the internal configuration of the power supply controller 200 according to the sixth embodiment. The power supply controller 200 in the present embodiment differs from that in the first embodiment in that the power supply controller 200 includes a power switch state-holding section 2000 in place of the power switch state-holding section 400 and a power state management section 2001 in place of the power state management section 401, and further includes a restart instruction-holding section 2002. That is, the power supply controller 200 is comprised of the power switch state-holding section 2000, the power state management section 2001, and the restart instruction-holding section 2002.

The power switch section 106 inputs the power switch signal 112 to the power switch state-holding section 2000.

The power switch state-holding section 2000 is comprised of an inverter 2000a and a D flip-flop 2000b. The power switch signal 112 is input to a clock input terminal of the D flip-flop 2000b after being logically inverted. Further, an output from an output terminal $Q_1$ is input to an input terminal D, and an output from an output terminal $Q_2$ is input to the power state management section 2001, the CPU 201, and the restart instruction-holding section 2002, as the power supply state signal 210. With this, upon detection of depression of the push switch 106a of the power switch section 106, the power switch state-holding section 2000 logically inverts the output therefrom to hold the logically inverted output and notifies the power state management section 2001, the CPU 201, and the restart instruction-holding section 2002 of the logically inverted output therefrom as the power supply state signal 210. Upon detection of the power-off state of the power supply state signal 210, the restart instruction-holding section 2002 checks the state of the service switch signal 119. As a result of the check of the service switch signal 119, if the service switch 306 is being depressed, the restart instruction-holding section 2002 asserts (sets to high level) a restart signal 2003 input to the power switch state-holding section 2000 and the power state management section 2001. On the other hand, as a result of the check of the service switch signal 119, if the service switch 306 is not being depressed, the restart instruction-holding section 2002 does not assert the restart signal 2003. Upon being notified of completion of shutdown processing via the shutdown completion signal 209, the power state management section 2001 checks the state of the restart signal 2003. As a result of the check of the restart signal 2003, if the restart signal 2003 has been asserted, the power state management section 2001 issues the CPU reset signal 208 to the CPU 201. After issuing the CPU reset signal 208, the power state management section 2001 issues a state clear signal 2004 so as to set the power supply state signal 210 to the on-state and deassert the restart signal 2003. On the other hand, as a result of the check of the restart signal 2003, if the restart signal 2003 has not been asserted, the power state management section 2001 switches the state of each of the power supply signals 116, 117, 118, and 211 to the power-off state and stops power supply to the components of the image forming apparatus 10. After stopping power supply, the power state management section 2001 issues a state clear signal 2004 to set the power supply state signal 210 to the off-state and deassert the restart signal 2003. Upon detection of the power-off state of the power supply state signal 210, the CPU 201 starts shutdown processing of the image forming apparatus 10. When the shutdown processing is completed, the CPU 201 notifies the power state management section 2001 of completion of the shutdown processing via the shutdown completion signal 209. Further, upon receipt of the CPU reset signal 208, the CPU 201 executes restart processing of the image forming apparatus 10.

Figure 21A:
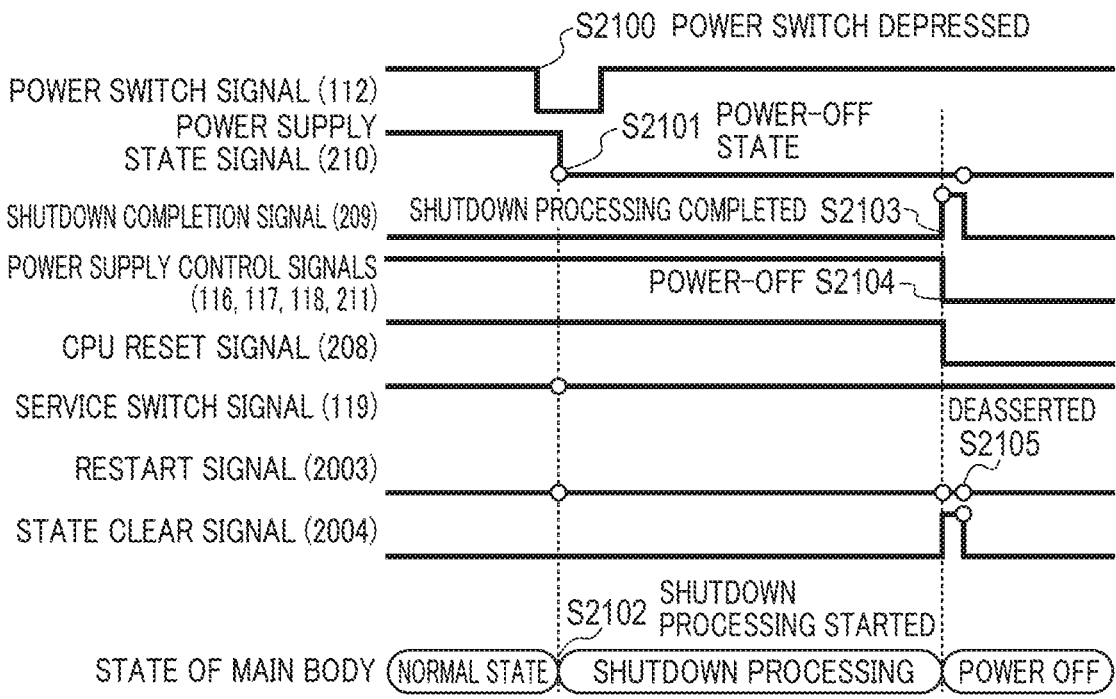
FIGS. 21A and 21B are timing diagrams of power supply control according to the sixth embodiment, which is performed by the power supply controller shown in FIG. 20.
Figure 21B:
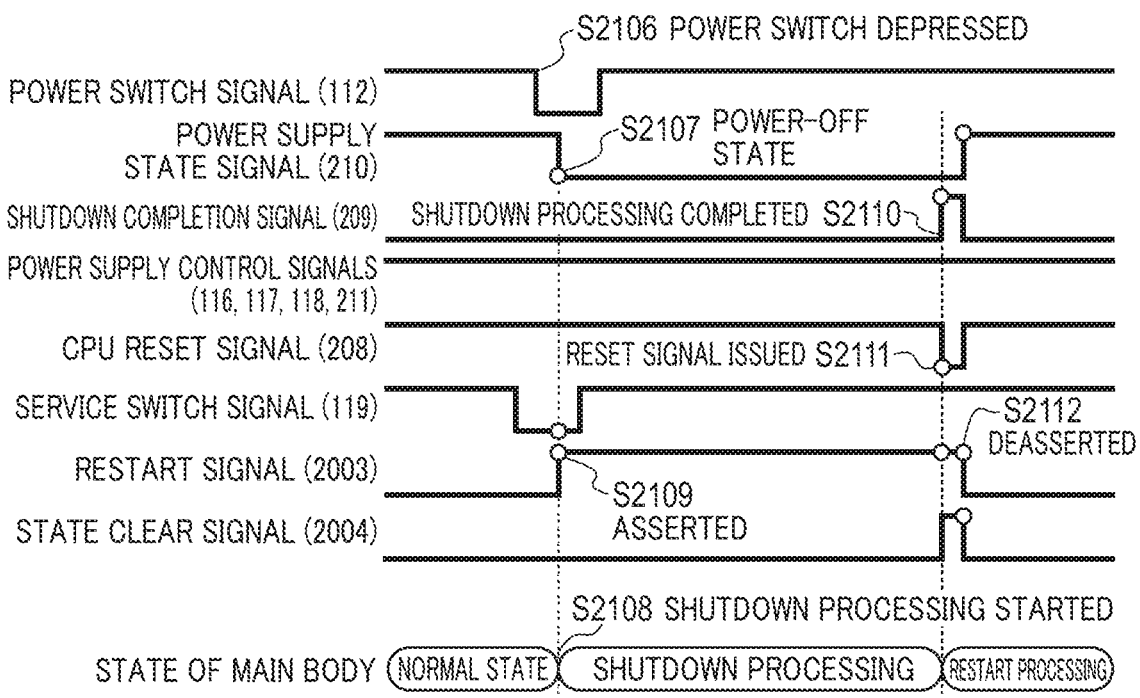

FIGS. 21A and 21B are timing diagrams of power supply control according to the sixth embodiment, which is performed by the power supply controller 200 shown in FIG. 20.

FIG. 21A is a power supply control timing diagram in a case where the service switch 306 is not depressed during depression of the push switch 106a of the power switch section 106 in the present embodiment. In this case, restart processing is not performed, but power-off processing is performed.

When the push switch 106a of the power switch section 106 is depressed (step S2100), the power switch state-holding section 2000 changes the power supply state signal 210 into the power-off state (step S2101). When the power supply state signal 210 is changed into the power-off state, the restart instruction-holding section 2002 checks the state of the service switch signal 119. As a result of the check of the service switch signal 119, if the service switch 306 is not being depressed, not causing the service switch signal 119 to be changed, the restart instruction-holding section 2002 does not assert (set to high level) the restart signal 2003. At the same time, the CPU 201, which detects the power-off state of the power supply state signal 210, starts shutdown processing of the image forming apparatus 10 (step S2102). When the shutdown processing of the image forming apparatus 10 is completed, the CPU 201 notifies the power state management section 2001 of completion of the shutdown processing via the shutdown completion signal 209 (step S2103). Upon receipt of the shutdown completion notification, the power state management section 2001 checks the restart signal 2003. Since the restart signal 2003 has not been asserted (not set to high level), the power state management section 2001 switches the state of each of the power supply control signals 116, 117, 118, and 211 to the power-off state and stops power supply to the components of the image forming apparatus 10 (step S2104). After shifting the state of each signal to the power-off state, the power state management section 2001 sets the power supply state signal 210 to the power-off state via the state clear signal 2004 and deasserts (sets to low level) the restart signal 2003 (step S2105).

Next, FIG. 21B is a power supply control timing diagram in a case where the service switch 306 is being depressed during depression of the push switch 106a of the power switch section 106 in the present embodiment. In this case, restart processing is performed after completion of shutdown processing.

When the push switch 106a of the power switch section 106 is depressed (step S2106), the power switch state-holding section 2000 changes the power supply state signal 210 into the power-off state (step S2107). When the power supply state signal 210 is changed into the power-off state, the restart instruction-holding section 2002 checks the state of the service switch signal 119. As a result of the check of the service switch signal 119, if the service switch 306 is being depressed, causing the service switch signal 119 to be changed, the restart instruction-holding section 2002 asserts (sets to high level) the restart signal 2003 (step S2109). At the same time, upon detection of the power-off state of the power supply state signal 210, the CPU 201 starts shutdown processing of the image forming apparatus 10 (step S2108). When the shutdown processing of the image forming apparatus 10 is completed, the CPU 201 notifies the power state management section 2001 of completion of the shutdown processing via the shutdown completion signal 209 (step S2110). Upon receipt of the shutdown completion notification, the power state management section 2001 checks the restart signal 2003. Since the restart signal 2003 has been asserted (set to high level), the power state management section 2001 issues the CPU reset signal 208 to the CPU 201 (step S2111). After issuing the CPU reset signal 208, the power state management section 2001 sets the power supply state signal 210 to the on-state via the state clear signal 2004 and deasserts (set to low level) the restart signal 2003 (step S2112). Upon receipt of the CPU reset signal 208, the CPU 201 executes restart processing of the image forming apparatus 10.

Figure 22:
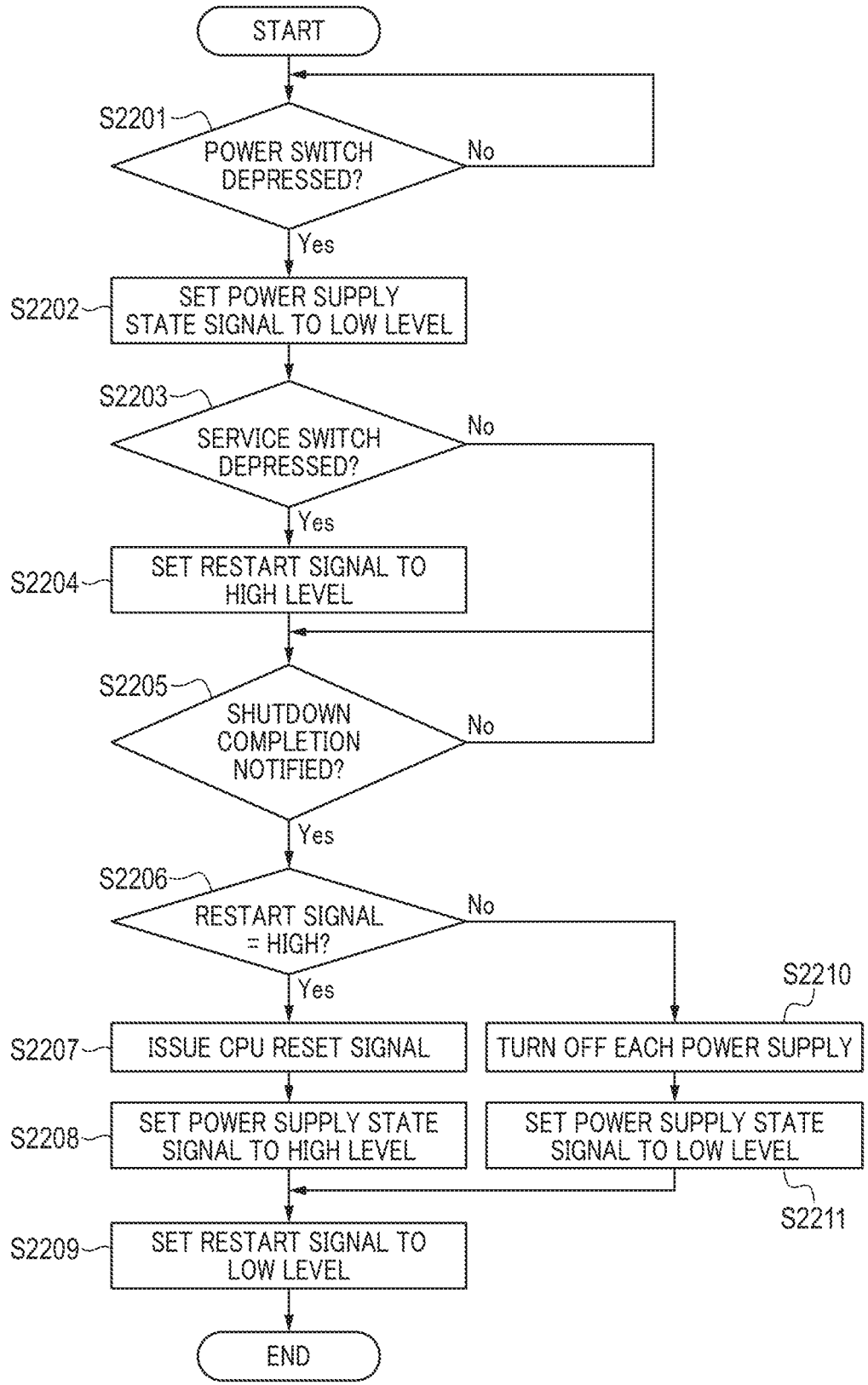
FIG. 22 is a flowchart of a power supply control process according to the sixth embodiment, which is performed by the power supply controller shown in FIG. 20.

FIG. 22 is a flowchart of a power supply control process according to the sixth embodiment, which is performed by the power supply controller 200 shown in FIG. 20. The present process is started when the image forming apparatus 10 enters the normal state.

First, in a step S2201, the power switch state-holding section 2000 determines whether or not the push switch 106a of the power switch section 106 has been depressed. If it is determined that the push switch 106a of the power switch section 106 has not been depressed (No to the step S2201), the power switch state-holding section 2000 waits until the push switch 106a of the power switch section 106 is depressed. If it is determined that the push switch 106a of the power switch section 106 has been depressed (Yes to the step S2201), the power switch state-holding section 2000 sets the power supply state signal 210 to low level (power-off state) (step S2202). Upon detection of the low level of the power supply state signal 210, the restart instruction-holding section 2002 determines via the service switch signal 119 whether or not the service switch 306 is being depressed (step S2203). If it is determined that the service switch 306 is not being depressed (No to the step S2203), the restart instruction-holding section 2002 proceeds to a step S2205 without changing the restart signal 2003. If it is determined that the service switch 306 is being depressed (Yes to the step S2203), the restart instruction-holding section 2002 sets the restart signal 2003 to high level (step S2204). After that, the power state management section 2001 determines via the shutdown completion signal 209 whether or not the shutdown completion notification has been received (step S2205). If no shutdown completion notification has been issued (No to the step S2205), the power state management section 2001 waits for the shutdown completion notification. If the shutdown completion notification has been received (Yes to the step S2205), the power state management section 2001 determines whether or not the restart signal 2003 is at high level (restart instruction has been received) (step S2206). If it is determined that the restart signal 2003 is at high level (restart instruction has been received) (Yes to the step S2206), the power state management section 2001 issues the CPU reset signal 208 (step S2207). After issuing the CPU reset signal 208, the power state management section 2001 sets the state clear signal 2004 to high level. When the state clear signal 2004 at high level is detected, the power state management section 2001 changes the state of the power supply state signal 210 to high level (power-on state) (step S2208), and proceeds to a step S2209. On the other hand, if it is determined that the restart signal 2003 is at low level (no restart instruction has been received) (No to the step S2206), the power state management section 2001 switches the state of each of the power supply signals 116, 117, 118, and 211 to the power-off state. With this, the power state management section 2001 stops power supply to the components of the image forming apparatus 10 (step S2210). After execution of the power-off processing, the power state management section 2001 sets the state clear signal 2004 to high level. Upon detection of high level of the state clear signal 2004, the power state management section 2001 sets the power supply state signal 210 to low level (power-off state) (step S2211), and proceeds to the step S2209.

In the step S2209, upon detection of high level of the state clear signal 2004, the restart instruction-holding section 2002 deasserts (set to low level) the restart signal 2003, followed by terminating the present process.

As described above, according to the sixth embodiment, it is possible to give a restart instruction without waiting until the power of the main body of the image forming apparatus 10 provided with the power switch section 106, which is the push switch, is completely turned off. This eliminates the user's waiting time and makes it possible to improve the usability.

Further, in the image forming apparatus 10 using the power switch section 106 as the push switch, it is possible to intentionally give a restart instruction, which makes it possible to prevent the image forming apparatus 10 from being restarted by an erroneous operation.

Next, a description will be given of a seventh embodiment of the present invention. The present embodiment is the same as the first to sixth embodiments in the basic operations in which the state of the power supply state signal 210 is checked when shutdown processing of the image forming apparatus 10 is completed and whether or not to restart the image forming apparatus 10 is determined according to the checked state.

The present embodiment differs from the sixth embodiment in that a special switch, such as the service switch 360, is not used. That is, when the image forming apparatus 10 is in the normal state, in a case where a user depresses the push switch 106a of the power switch section 106 in a state in which the user is depressing both of the operation liquid crystal panel unit 301 and the key section 305 of the console section 103 (the third user's operation has been performed), it is determined that a restart instruction has been given by the user. In this case, restart processing is performed after completion of shutdown processing. On the other hand, in a case where a user depresses only the push switch 106a of the power switch section 106 when the image forming apparatus 10 is in the normal state, power-off processing is performed after completion of shutdown processing.

Figure 23:
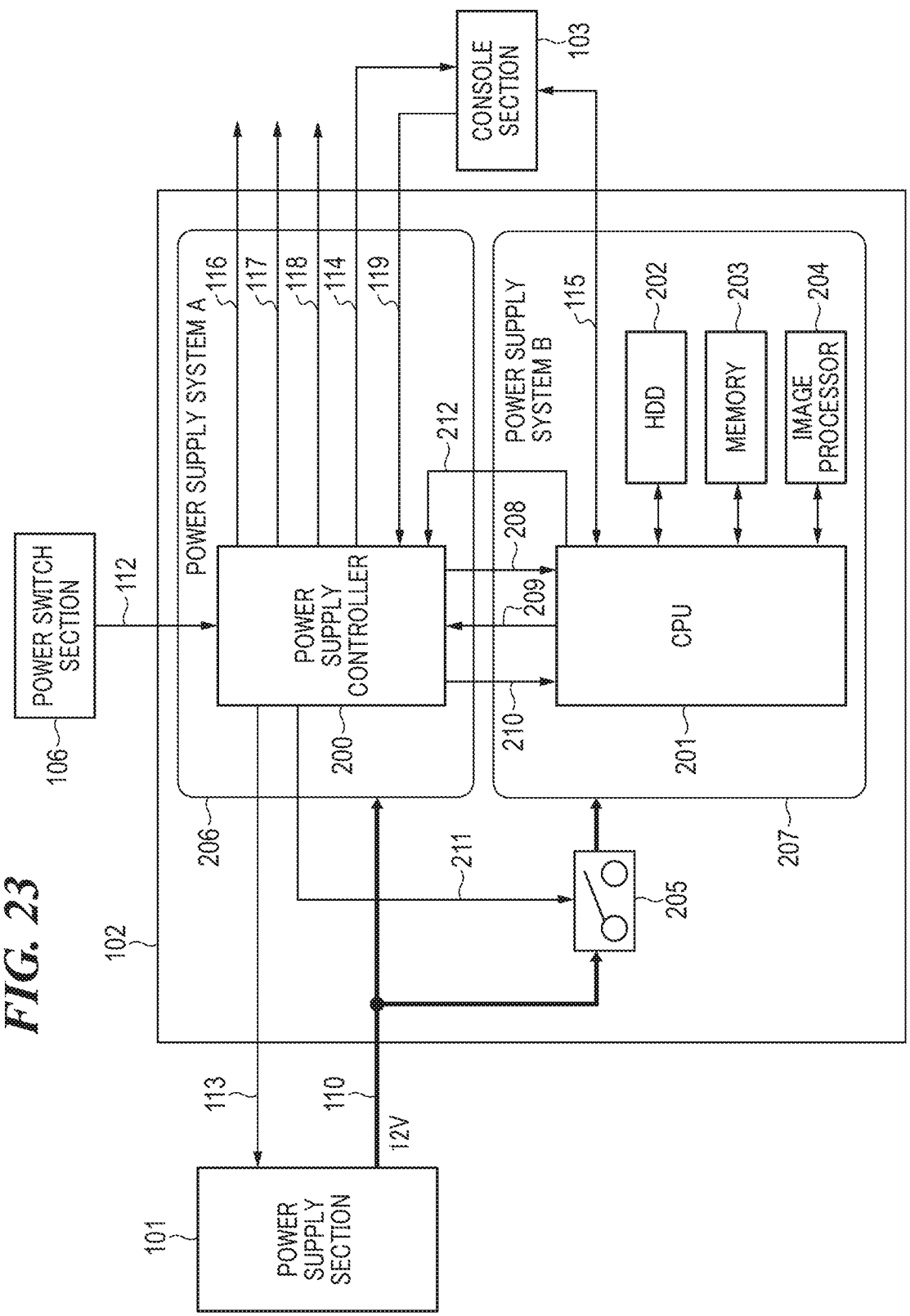
FIG. 23 is a block diagram showing the internal configuration of a controller, appearing in FIG. 1, according to a seventh embodiment.

FIG. 23 is a block diagram showing the internal configuration of the controller 102 according to the seventh embodiment. Similar to the first embodiment, the controller 102 is comprised of the power supply controller 200, the power supply system B power supply section 205, the CPU 201, the HDD 202, the memory 203, and the image processor 204. The controller 102 in the present embodiment differs from that in the first embodiment in that a restart operation signal 212 input from the CPU 201 to the power supply controller 200 is added.

The CPU 201 can detect a user' operation preformed on the operation liquid crystal panel unit 301 and the key section 305 of the console section 103, via the console panel control signal 115. The CPU 201 recognizes a restart instruction when a specific operation is executed by a user, and notifies the power supply controller 200 of the restart instruction via the restart operation signal 212. Note that in the present embodiment, the above-mentioned specific operation refers to an operation for depressing both of the operation liquid crystal panel unit 301 and the key section 305, but this is not limitative insofar as it is an operation for pressing not a special switch, such as the service switch 306, but a switch or switches or the like disposed on the console section 103.

Figure 24:
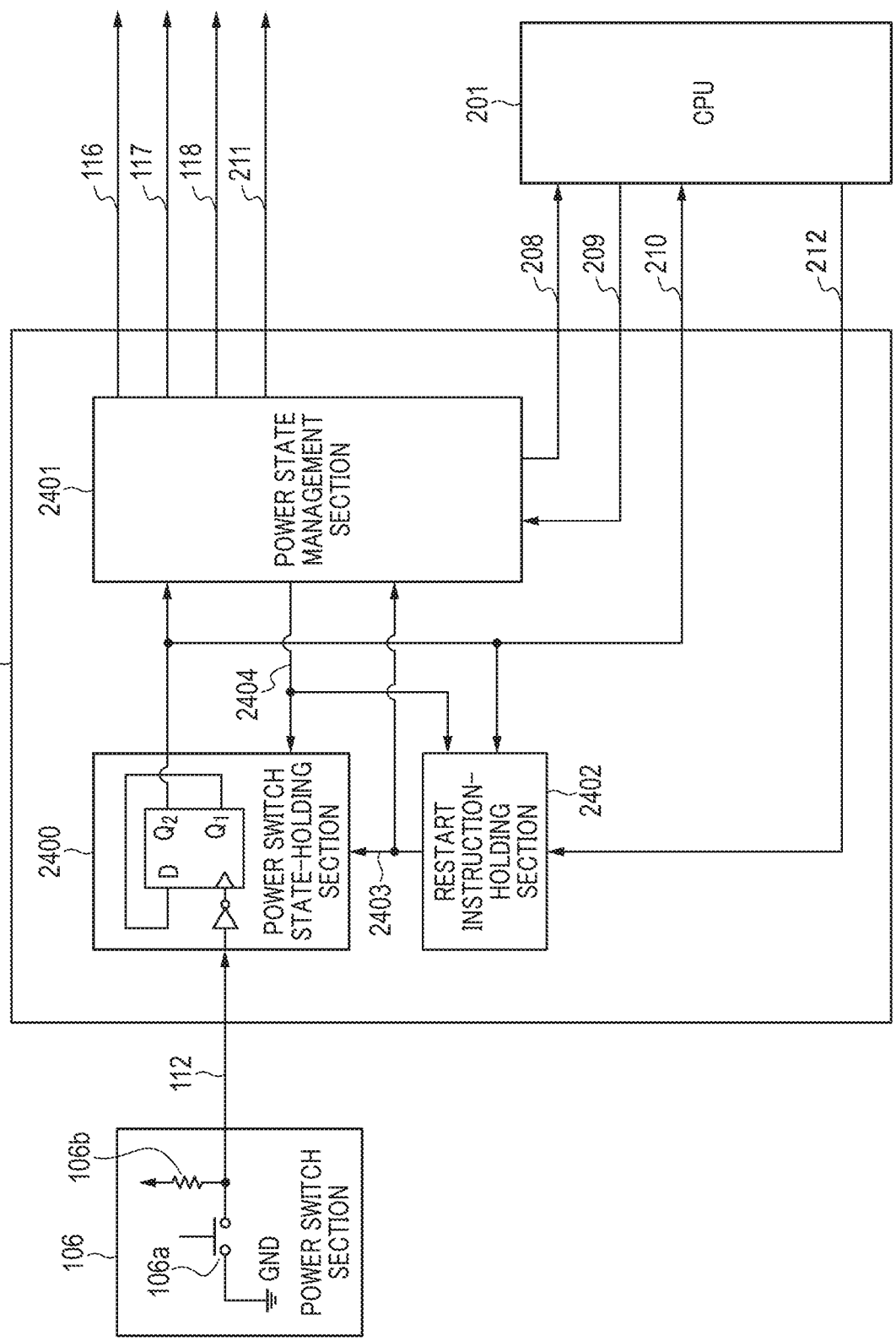
FIG. 24 is a block diagram showing the internal configuration of a power supply controller, appearing in FIG. 1, according to the seventh embodiment.

FIG. 24 is a block diagram showing the internal configuration of the power supply controller 200 according to the seventh embodiment. The power supply controller 200 in the present embodiment differs from that in the sixth embodiment in the following points: First, the power supply controller 200 includes a power switch state-holding section 2400 in place of the power switch state-holding section 2000 and a power state management section 2401 in place of the power state management section 2001, and further includes a restart instruction-holding section 2402 in place of the restart instruction-holding section 2002. That is, the power supply controller 200 differs from that in the sixth embodiment in that the restart instruction-holding section 2402 holds the restart operation signal 212 output from the CPU 201 as a restart instruction.

Upon detection of the power-off state of the power supply state signal 210, the restart instruction-holding section 2402 checks the state of the restart operation signal 212. As a result of the check of the restart operation signal 212, if it is determined that the operation liquid crystal panel unit 301 and the key section 305 are being depressed, the restart instruction-holding section 2402 asserts (sets to high level) a restart signal 2403 into the power switch state-holding section 2400 and the power state management section 2401. On the other hand, as a result of the check of the restart operation signal 212, if it is determined that the operation liquid crystal panel unit 301 and the key section 305 are not being depressed, the restart instruction-holding section 2402 does not assert (set to high level) the restart signal 2403.

Figure 25A:
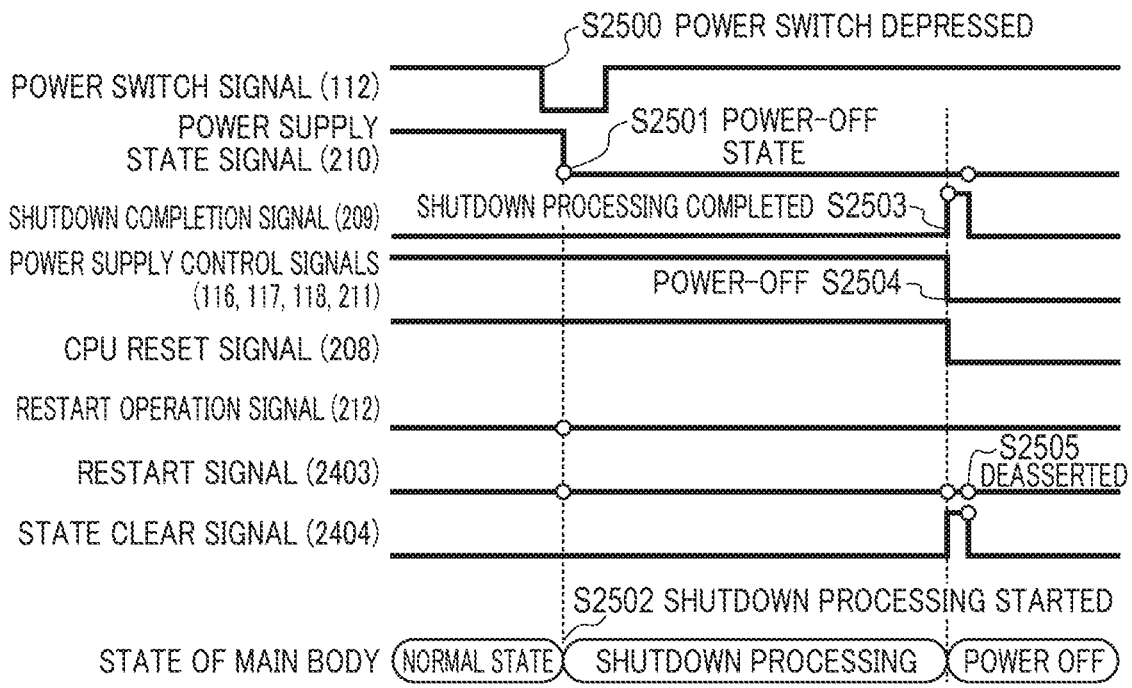
FIGS. 25A and 25B are timing diagrams of power supply control according to the seventh embodiment, which is performed by the power supply controller shown in FIG. 24.
Figure 25B:
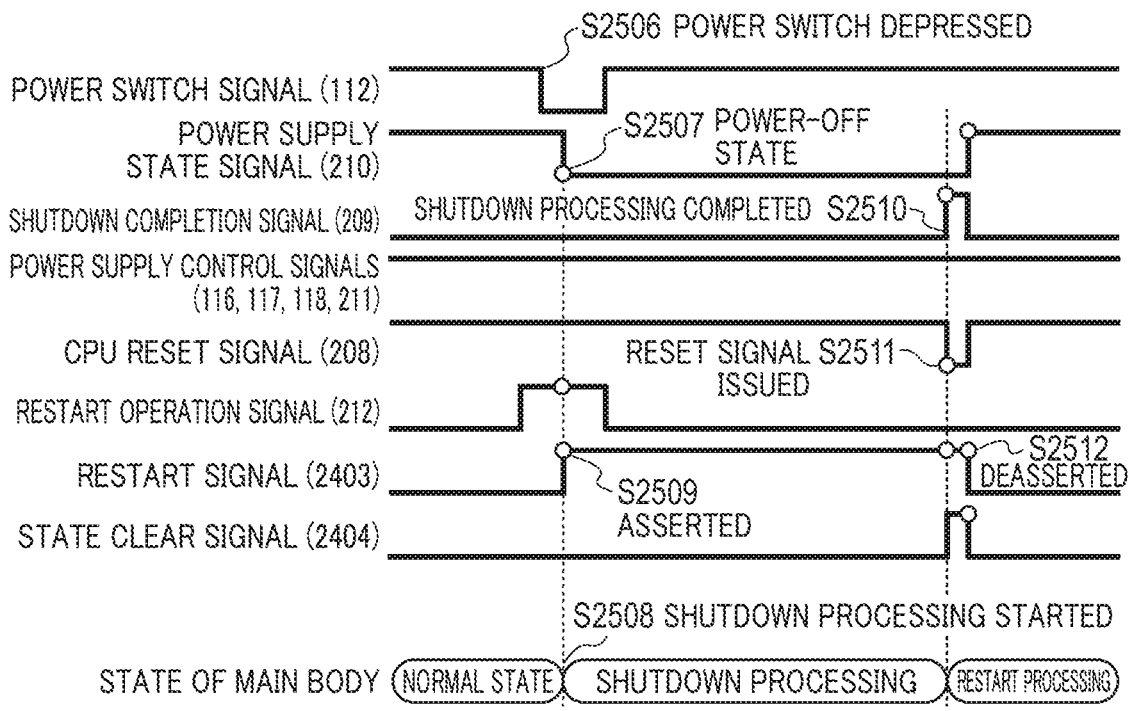

FIGS. 25A and 25B are timing diagrams of power supply control according to the seventh embodiment, which is performed by the power supply controller 200 shown in FIG. 24.

FIG. 25A is a power supply control timing diagram in a case where both the operation liquid crystal panel unit 301 and the key section 305 are not being depressed during depression of the push switch 106a of the power switch section 106 in the present embodiment. In this case, restart processing is not performed, but power-off processing is performed.

When the push switch 106a of the power switch section 106 is depressed (step S2500), the power switch state-holding section 2400 changes the power supply state signal 210 into the power-off state (step S2501). When the power supply state signal 210 is changed into the power-off state, the restart instruction-holding section 2402 checks the state of the restart operation signal 212. In FIG. 25A, the restart operation signal 212 has not been changed, and hence the restart instruction-holding section 2402 does not assert (set to high level) the restart signal 2403. At the same time, upon detection of the power-off state of the power supply state signal 210, the CPU 201 starts shutdown processing of the image forming apparatus 10 (step S2502). When the shutdown processing of the image forming apparatus 10 is completed, the CPU 201 notifies the power state management section 2401 of completion of the shutdown processing via the shutdown completion signal 209 (step S2503). Upon receipt of the shutdown completion notification, the power state management section 2401 checks the restart signal 2403. Since the restart signal 2403 has not been asserted (not set to high level), the power state management section 2401 switches the state of each of the power supply control signals 116, 117, 118, and 211 to the power-off state, and stops power supply to the components of the image forming apparatus 10 (step S2504). After shifting the state of each signal to the power-off state, the power state management section 2401 sets the power supply state signal 210 to the power-off state vi a state clear signal 2404 and deasserts the restart signal 2403 (step S2505).

Next, FIG. 25B is a power supply control timing diagram in a case where both of the operation liquid crystal panel unit 301 and the key section 305 are being depressed during depression of the push switch 106a of the power switch section 106 in the present embodiment. In this case, restart processing is performed after completion of shutdown processing.

When the push switch 106a of the power switch section 106 is depressed (step S2506), the power switch state-holding section 2400 changes the power supply state signal 210 into the power-off state (step S2507). When the power supply state signal 210 is changed into the power-off state, the restart instruction-holding section 2402 checks the state of the restart operation signal 212. Note that if it is determined that both of the operation liquid crystal panel unit 301 and the key section 305 are being depressed, the CPU 201 asserts (sets to high level) the restart operation signal 212. In FIG. 25B, the restart operation signal 212 is asserted (set to high level), and hence the restart instruction-holding section 2402 asserts (sets to high level) the restart signal 2403 (step S2509). At the same time, upon detection of the power-off state of the power supply state signal 210, the CPU 201 starts shutdown processing of the image forming apparatus 10 (step S2508). When the shutdown processing of the image forming apparatus 10 is completed, the CPU 201 notifies the power state management section 2401 of completion of the shutdown processing via the shutdown completion signal 209 (step S2510). Upon receipt of the shutdown completion notification, the power state management section 2401 checks the restart signal 2403. Since the restart signal 2403 has been asserted (set to high level), the power state management section 2401 issues the CPU reset signal 208 to the CPU 201 (step S2511). After issuing the CPU reset signal 208, the power state management section 2401 sets the power supply state signal 210 to the on-state via the state clear signal 2004 and deasserts (set to low level) the restart signal 2403 (step S2512). Upon receipt of the CPU reset signal 208, the CPU 201 executes restart processing of the image forming apparatus 10.

Figure 26:
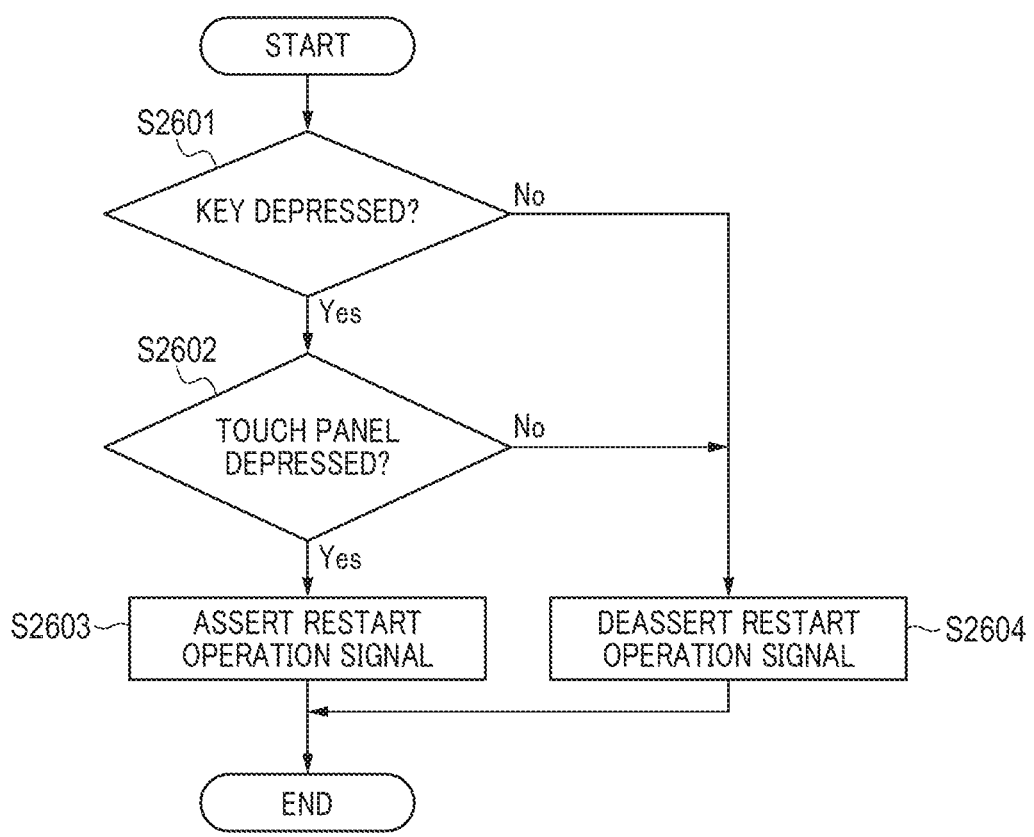
FIG. 26 is a flowchart of a restart operation detection process according to the seventh embodiment, which is performed by a CPU appearing in FIG. 23.

FIG. 26 is a flowchart of a restart operation detection process according to the seventh embodiment, performed by the CPU 201 appearing in FIG. 23. The present process is started when the image forming apparatus 10 enters the normal state.

First, the CPU 201 determines whether or not the key section 305 of the console section 103 is being depressed (step S2601). If it is determined that the key section 305 of the console section 103 is being depressed (Yes to the step S2601), the CPU 201 determines whether or not the touch panel of the operation liquid crystal panel unit 301 of the console section 103 is being depressed (step S2602). If it is determined that the touch panel of the operation liquid crystal panel unit 301 is being depressed (Yes to the step S2602), the CPU 201 asserts (set to high level) the restart operation signal 212. With this, the CPU 201 notifies the restart instruction-holding section 2402 that the restart operation has been executed (step S2603), followed by terminating the present process. On the other hand, if it is determined that the key section 305 of the console section 103 is not being depressed or it is determined that the touch panel of the operation liquid crystal panel unit 301 is not being depressed (No to the step S2601 or S2602), the process proceeds to a step S2604. In the step S2604, the CPU 201 deasserts (sets to low level) the restart operation signal 212, followed by terminating the present process. Note that the shutdown processing performed by the CPU 201 is the same as the flowchart in the embodiment, shown in FIG. 6.

Figure 27:
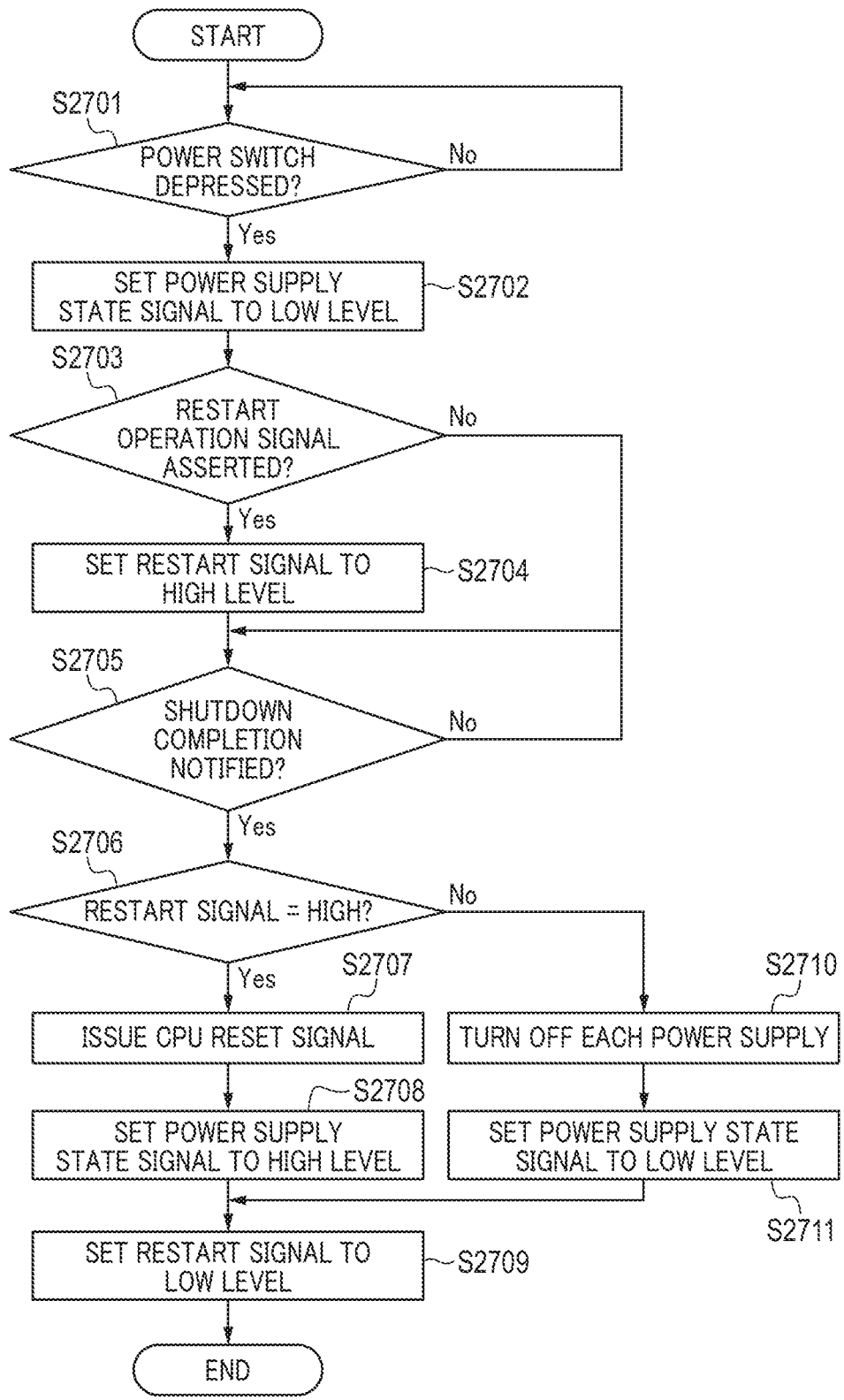
FIG. 27 is a flowchart of a power supply control process according to the seventh embodiment, which is performed by the power supply controller shown in FIG. 24.

FIG. 27 is a flowchart of a power supply control process according to the seventh embodiment, which is performed by the power supply controller 200 shown in FIG. 24. The present process is started when the image forming apparatus 10 enters the normal state.

First, in a step S2701, the power switch state-holding section 2400 determines whether or not the push switch 106a of the power switch section 106 has been depressed. If it is determined that the push switch 106a of the power switch section 106 has not been depressed (No to the step S2701), the power switch state-holding section 2400 waits until the push switch 106a of the power switch section 106 is depressed. If it is determined that the push switch 106a of the power switch section 106 has been depressed (Yes to the step S2701), the power switch state-holding section 2400 sets the power supply state signal 210 to low level (power-off state) (step S2702). Upon detection of the low level of the power supply state signal 210, the restart instruction-holding section 2402 determines whether or not the restart operation signal 212 has been asserted (set to high level) (step S2703). If it is determined that the restart operation signal 212 has not been asserted (not set to high level) (No to the step S2703), the restart instruction-holding section 2402 proceeds to a step S2705 without changing the restart signal 2403. If it is determined that the restart operation signal 212 has been asserted (set to high level) (Yes to the step S2703), the restart instruction-holding section 2402 asserts (sets to high level) the restart signal 2403 (step S2704). After that, the power state management section 2401 determines via the shutdown completion signal 209 whether or not the shutdown completion notification has been received (step S2705). If no shutdown completion notification has been issued (No to the step S2705), the power state management section 2401 waits for the shutdown completion notification. If the shutdown completion notification has been received (Yes to the step S2705), the power state management section 2401 determines whether or not the restart signal 2403 is at high level (restart instruction has been received) (step S2706). If it is determined that the restart signal 2403 is at high level (restart instruction has been received) (Yes to the step S2706), the power state management section 2401 issues the CPU reset signal 208 (step S2707). After issuing the CPU reset signal 208, the power state management section 2401 sets the state clear signal 2404 to high level. Upon detection of the high level of the state clear signal 2404, the power state management section 2401 changes the power supply state signal 210 to high level (power-on state) (step S2708), and proceeds to a step S2709. On the other hand, if it is determined that the restart signal 2403 is at low level (restart instruction has not been received) (No to the step S2706), the power state management section 2401 switches the state of each of the power supply signals 116, 117, 118, and 211 to the power-off state. With this, the power state management section 2401 stops power supply to the components of the image forming apparatus 10 (step S2710). After that, the power state management section 2401 sets the state clear signal 2404 to high level. Upon detection of the high level of the state clear signal 2404, the power state management section 2401 changes the state of the power supply state signal 210 to low level (power-off state) (step S2711) and proceeds to the step S2709.

In the step S2709, upon detection of the high level of the state clear signal 2404, the restart instruction-holding section 2402 deasserts (sets to low level) the restart signal 2403 to low level, followed by terminating the present process.

As described above, according to the seventh embodiment, it is possible to give a restart instruction without waiting until the power of the main body of the image forming apparatus 10 provided with the power switch section 106, which is the push switch, is completely turned off. This eliminates the user's waiting time and makes it possible to improve the usability.

Further, in the image forming apparatus 10 using the power switch section 106 as the push switch, it is possible to intentionally give a restart instruction without using a special switch, which makes it possible to prevent the image forming apparatus 10 from being restarted by an erroneous operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094637 filed May 16, 2018, which is hereby incorporated by reference herein in its entirety.

What is claimed is:
1. An information processing apparatus comprising:
 a momentary-type switch that is on while a user is operating and off while the user is not operating;

a controller, including a processor and a memory, and configured to:
  execute a shutdown processing of the information processing apparatus in accordance with a user's operation of the momentary-type switch, and store information in a storage when the momentary-type switch is operated by the user during the shutdown processing;
  restart the information processing apparatus when at least part of the shutdown processing is completed based on the information stored in the storage in a case where the information is stored in the storage when the at least part of the shutdown processing is completed; and
  does not restart the information processing apparatus when the at least part of the shutdown processing is completed in a case where the information is not stored in the storage.

2. The information processing apparatus according to claim 1, further comprising:
  a display configured to display information,
  wherein the controller:
    restarts the information processing apparatus after completion of the shutdown processing in a case where the information is stored in the storage when the at least part of the shutdown processing is completed; and
    controls the display to display a notification that the information processing apparatus is to be turned off after completion of the shutdown processing in a case where the information is not stored in the storage.

3. The information processing apparatus according to claim 1, wherein the information stored in the storage indicates that a power supply state of the information processing apparatus has been switched from an off state to an on state.

4. The information processing apparatus according to claim 3, further comprising:
  a timer configured to start counting when the power supply state of the information processing apparatus is switched to the off state, and
  wherein in a case where a count value of the timer becomes not smaller than a predetermined value when at least part of the shutdown processing is completed, the storage does not store the information indicating that the power supply state of the information processing apparatus has been switched from the off state to the on state until the shutdown processing is completed.

5. The information processing apparatus according to claim 3, further comprising:
  a timer configured to perform counting as long as the user's operation on the momentary-type switch is continued and a count value of the timer is smaller than a predetermined value, and
  wherein in a case where the count value becomes not smaller than the predetermined value when the user's operation on the momentary-type switch is continued, the power supply state of the information processing apparatus is switched from the off state to the on state, and the storage stores the information indicating that the power supply state of the information processing apparatus has been switched from the off state to the on state until the shutdown processing is completed.

6. The information processing apparatus according to claim 5, wherein:
  the timer sets the count value to 0 in a case where the count value at a time when the user's operation on the momentary-type switch is canceled is smaller than the predetermined value, and performs counting again as long as a second user's operation on the momentary-type switch subsequent to the user's operation is continued and the count value is smaller than the predetermined value, and
  in a case where the count value becomes not smaller than the predetermined value when the second user's operation is continued, the power supply state of the information processing apparatus is switched from the off state to the on state, and the storage stores the information indicating that the power supply state of the information processing apparatus has been switched from the off state to the on state until the shutdown processing is completed.

7. The information processing apparatus according to claim 1, wherein the controller restarts the information processing apparatus after completion of the shutdown processing, in a case where another user's operation is performed when the user's operation on the momentary-type switch is performed.

8. The information processing apparatus according to claim 7, further comprising:
  a user interface including a service switch,
  wherein the another user's operation is an operation for depressing the service switch.

9. The information processing apparatus according to claim 7, further comprising:
  a user interface including a key section and a touch panel,
  wherein the another user's operation is an operation for depressing both the key section and the touch panel.

10. A power supply control method for an information processing apparatus including a momentary-type switch, that is on while a user is operating and off while the user is not operating, the method comprising:
  executing a shutdown processing of the information processing apparatus in accordance with a user's operation of the momentary-type switch, and storing information in a storage when the momentary-type switch is operated by the user during the shutdown processing;
  restarting the information processing apparatus when at least part of the shutdown processing is completed based on the information stored in the storage in a case where the information is stored in the storage when the at least part of the shutdown processing is completed; and
  not restarting the information processing apparatus when the at least part of the shutdown processing is completed in a case where the information is not stored in the storage.

11. The power supply control method according to claim 10, further comprising:
  displaying information on a display,
  wherein the restarting restarts the information processing apparatus after completion of the shutdown processing in a case where the information is stored in the storage when the at least part of the shutdown processing is completed; and
  controlling the display to display a notification that the information processing apparatus is to be turned off after completion of the shutdown processing in a case where the information is not stored in the storage.

12. The power supply control method according to claim 10, wherein the information stored in the storage indicates that a power supply state of the information processing apparatus has been switched from an off state to an on state.

13. The power supply control method according to claim 12, wherein:
the information processing apparatus includes a timer configured to start counting when the power supply state of the information processing apparatus is switched to the off state,
the method further comprises not storing in the storage, in a case where a count value of the timer becomes not smaller than a predetermined value when at least part of the shutdown processing is completed, the information indicating that the power supply state of the information processing apparatus has been switched from the off state to the on state until the shutdown processing is completed.

14. The power supply control method s according to claim 12, wherein:
the information processing apparatus includes a timer configured to perform counting as long as the user's operation on the momentary-type switch is continued and a count value is smaller than a predetermined value,
the method further comprises switching, in a case where the count value becomes not smaller than the predetermined value when the user's operation on the momentary-type switch is continued, the power supply state of the information processing apparatus from the off state to the on state, and storing in the storage the information indicating that the power supply state of the information processing apparatus has been switched from the off state to the on state until the shutdown processing is completed.

15. The power supply control method according to claim 14, wherein:
the timer sets the count value to 0 in a case where the count value at a time when the user's operation on the momentary-type switch is canceled is smaller than the predetermined value, and performs counting again as long as a second user's operation on the momentary-type switch subsequent to the user's operation is continued and the count value is smaller than the predetermined value, and the method further comprises switching, in a case where the count value becomes not smaller than the predetermined value when the second user's operation is continued, the power supply state of the information processing apparatus from the off state to the on state, and storing in the storage the information indicating that the power supply state of the information processing apparatus has been switched from the off state to the on state until the shutdown processing is completed.

16. The power supply control method according to claim 10, wherein the restarting restarts the information processing apparatus after completion of the shutdown processing, in a case where another user's operation is performed when the user's operation on the momentary-type switch is performed.

17. The power supply control method according to claim 16, wherein:
the information processing apparatus further includes a user interface including a service switch, and
the another user's operation is an operation for depressing the service switch.

18. A non-transitory computer-readable storage medium storing a program executable by a computer to execute a power supply control method for an information processing apparatus including a momentary-type switch that is on while a user is operating and off while the user is not operating, the method comprising:
executing a shutdown processing of the information processing apparatus in accordance with a user's operation of the momentary-type switch, and storing information in a storage when the momentary-type switch is operated by the user during the shutdown processing;
restarting the information processing apparatus when at least part of the shutdown processing is completed based on the information stored in the storage in a case where the information is stored in the storage when the at least part of the shutdown processing is completed; and
not restarting the information processing apparatus when the at least part of the shutdown processing is completed in a case where the information is not stored in the storage.

* * * * *